US005721650A

United States Patent [19]
Crane et al.

[11] Patent Number: 5,721,650
[45] Date of Patent: Feb. 24, 1998

[54] SELF-LOADING DISC HEAD SLIDER HAVING BLUNT CROSS RAIL

[75] Inventors: Peter Crane; Scott Robert Warmka, both of Richfield; Jih-Ping Peng, Bloomington, all of Minn.

[73] Assignee: Seagate Technology, Inc., Scotts Valley, Calif.

[21] Appl. No.: 703,072

[22] Filed: Aug. 26, 1996

[51] Int. Cl.⁶ .................................................. G11B 5/60
[52] U.S. Cl. ................................................... 360/103
[58] Field of Search ....................................... 360/103

[56] References Cited

U.S. PATENT DOCUMENTS

| | | | |
|---|---|---|---|
| 3,855,625 | 12/1974 | Garnier et al. | 360/103 |
| 4,475,135 | 10/1984 | Warner et al. | 360/103 |
| 4,673,996 | 6/1987 | White | 360/103 |
| 4,802,042 | 1/1989 | Strom | 360/103 |
| 4,996,614 | 2/1991 | Okutsu | 360/103 |
| 5,200,868 | 4/1993 | Chapin et al. | 360/103 |
| 5,210,666 | 5/1993 | Chapin et al. | 360/103 |
| 5,327,311 | 7/1994 | Ananth | 360/103 |
| 5,430,591 | 7/1995 | Takeuchi et al. | 360/103 |
| 5,490,025 | 2/1996 | Dorius et al. | 360/103 |
| 5,490,026 | 2/1996 | Dorius et al. | 360/103 |
| 5,515,219 | 5/1996 | Ihrke et al. | 360/103 |

OTHER PUBLICATIONS

S. Lu, H. M. Stanley, D.B. Bogy, C.S. Bhatia and Y.-T. Hsia, "Design, Simulation, Fabrication and Measurement of a 25 NM, 50% Slider," *IEEE Transactions of Magnetics*, vol. 31, No. 6, Nov. 1995.

*Primary Examiner*—A. J. Heinz
*Attorney, Agent, or Firm*—Westman, Champlin & Kelly P.A.

[57] ABSTRACT

A self-loading disc head slider includes a leading slider edge, a trailing slider edge and first and second raised side rails with first and second bearing surfaces, respectively. A cross rail extends between and is coplanar with the first and second raised side rails. A tapered surface is formed within the first and second raised side rails and the cross rail. The tapered surface extends from the leading slider edge to an intersection with the first and second bearing surfaces. A subambient pressure cavity is positioned between the cross rail and the trailing slider edge. A notch is positioned within the tapered surface, which extends from the leading slider edge to the cross rail and terminates prior to the intersection. The notch defines a leading edge of the cross rail along the tapered surface such that the leading edge of the cross rail is recessed from the first and second bearing surfaces.

27 Claims, 18 Drawing Sheets

SELF-LOADING DISC HEAD SLIDER HAVING BLUNT CROSS RAIL

BACKGROUND OF THE INVENTION

The present invention relates to disc drive storage systems and, more particularly, to a disc drive storage system having a slider with a blunt cross rail.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective head gimbal assemblies (HGAs). Head gimbal assemblies carry transducers which write information to and read information from the disc surface. An actuator mechanism moves the head gimbal assemblies from track to track across the surfaces of the discs under control of electronic circuitry. The actuator mechanism includes a track accessing arm and a load beam for each head gimbal assembly. The load beam provides a preload force which forces the head gimbal assembly toward the disc surface.

The head gimbal assembly includes a hydrodynamic (e.g. air) bearing slider and a gimbal. The gimbal is positioned between the slider and the load beam to provide a resilient connection that allows the slider to pitch and roll while following the topography of the disc. The slider includes an air bearing surface which faces the disc surface. Self-loading or "negative pressure" air bearing (NPAB) surfaces have been used in the disc drive industry for many years. These air bearing surfaces are fabricated on ceramic sliders which additionally have one or two recording heads mounted on them. The bearing clearance at the recording head is an important parameter to the disc drive performance. It is desired to minimize the variation in the head clearance or "flying height". One source of flying height variation is the variation in the disc surface velocity from the disc inner diameter (ID) to the disc outer diameter (OD). Another source is from normal process variations of manufacturing parameters such as the suspension "pitch static angle" (PSA), the preload force and the leading taper length.

Self-loading air bearing surfaces have several common features, including a leading taper, a pair of raised side rails, a cross rail and a subambient pressure cavity. The leading taper is lapped onto the end of the slider that is opposite to the recording head. As the disc rotates, the disc drags air under the slider along the air bearing surfaces in a direction approximately parallel to the tangential velocity of the disc. The leading taper pressurizes the air as the air is dragged under the slider by the disc surface. Disc pressurization increases the bearing load capacity. An additional effect of the leading taper is that the pressure distribution under the slider has a peak near the taper end or "leading edge" due to the high compression angle of the taper, and a second peak near the recording end or "trailing edge" due to a low bearing clearance required for efficient magnetic recording. This dual-peak pressure distribution results in an air bearing with a high pitch stiffness. A high pitch stiffness results in a head flying height which is relatively insensitive to process variations in the suspension PSA.

The pair of raised side rails extends downstream from the taper. The side rail closest to the disc hub is called the "inner rail" and the side rail closest to the disc rim is called the "outer rail". The rails may extend from the taper to the trailing edge, in which case there are usually two heads, with one head mounted near the trailing end of each rail. Alternatively, there may be a single head mounted on a center rail or a center island positioned at the trailing edge. In this case, the raised side rails are truncated prior to the trailing edge.

The subambient pressure cavity is positioned between the inner and outer rails. The subambient pressure cavity is opened to the atmosphere at the trailing edge, and is bounded by the cross rail located near the leading edge. The cross rail extends between the inner rail and the outer rail. The cross rail provides an expansion path for the air to depressurize as it is dragged into the subambient pressure cavity by the disc velocity. The expanded air in the cavity provides a self-loading force which forces the slider toward the disc surface. The self-loading force counteracts the hydrodynamic lifting force developed along the inner and outer rails. The counteraction between the positive and negative forces reduces flying height sensitivity with respect to disc velocity and increases air bearing stiffness.

In a typical range of disc sliding velocities, a very shallow leading taper angle of about 1.0 milliradians or less provides a head flying height which is nearly constant from the ID to OD. However, present process limitations typically restrict manufacture of the taper angle to 4.0 milliradians or higher. This high of a taper angle tends to increase the pressurization of the air bearing surface from the ID to the OD, which tends to increase the recording head flying height at the OD and reduce the efficiency of the magnetic recording process and the disc drive data storage capacity.

A technique commonly used to counteract the non-ideal pressurization characteristics of the current high taper angle is to reduce the surface area of the leading taper. An additional advantage to a small leading taper area is that the flying pitch angle of the slider is reduced. A reduced pitch angle retains the air under the leading taper and forms the dual-peak pressure distribution, which results in high pitch stiffness and a head flying height which is relatively insensitive to normal variations in the suspension PSA.

The taper surface area can be reduced by removing material from the air bearing surface to a predefined depth through various methods, such as ion milling, chemical etching, or Reactive Ion Etching (RIE). There are two main configurations for allocating the areas to be etched. First, material can be removed from the central region of the taper, which results in a "notched taper" configuration. The notched taper configuration can be formed by removing material to a depth of about 0.5 to 2.0 microns from the central region of the taper and the cross rail. The subambient pressure cavity is then etched to a depth of about 2–7 microns. This method has the advantage that the cross rail is recessed from the air bearing surface and is therefore less likely to collect wear debris particles. This method has the disadvantage that two photolithographic masking and etching steps are required to form the recessed cross rail and the subambient pressure cavity. Chapin et al. U.S. Pat. No. 5,210,666 discloses a self-loading slider having a full-width taper, a subambient pressure cavity and a notched cross rail, which are fabricated in a two-step milling process.

Alternatively, the notched taper configuration can be formed by removing material from the central region of the taper to a depth substantially equal to the subambient pressure cavity depth. With this method, the cross rail is typically at the same level as the side rails. Although this method requires only a single photolithographic masking and etching step, the cross rail tends to collect wear debris particles due to a sharp edge along the width of the cross rail. Garnier et al. U.S. Pat. No. 3,855,625 discloses a self-loading slider having a notch removed from the central region of the taper.

Second, the taper surface area can be reduced by removing material from the outer and inner edges of the air bearing surface, which results in a "narrow taper" configuration. The air bearing surface width at the taper area is substantially less than the air bearing surface width downstream of the taper. Takeuchi et al. U.S. Pat. No. 5,430,591 discloses examples of a "narrow taper" configuration.

SUMMARY OF THE INVENTION

The self-loading disc head slider of the present invention includes a leading slider edge, a trailing slider edge and first and second raised side rails with first and second bearing surfaces, respectively. A cross rail extends between and is coplanar with the first and second raised side rails. A tapered surface is formed within the first and second raised side rails and the cross rail. The tapered surface extends from the leading slider edge to an intersection with the first and second bearing surfaces. A subambient pressure cavity is positioned between the cross rail and the trailing slider edge. A notch is positioned within the tapered surface, which extends from the leading slider edge to the cross rail and terminates prior to the intersection. The notch defines a leading edge of the cross rail along the tapered surface, such that the leading edge of the cross rail is recessed from the first and second bearing surfaces.

In one embodiment, the notch has a notch depth with respect to the bearing surfaces which is equal to the depth of the subambient pressure cavity. This embodiment requires only a single photolithographic masking and etching iteration to form the features in the slider surface.

In another embodiment, the notch extends from the leading slider edge to the subambient pressure cavity and has a depth which is less than the depth of the subambient pressure cavity. The first and second side rails include inside and outside rail edges, a leading portion, a waist portion, a leg extending from the waist portion to the leading portion, and a minimum width at the waist portion. The outside rail edges converge toward one another along the leg from the waist portion to the leading portion and then diverge from one another along the leading portion as the outside rail edges cross the intersection.

In yet another embodiment, the slider further includes a recording head supported in a head encapsulation layer at the trailing ends of the side rails. The inside edges of the side rails are trimmed to a minimum distance from the head such that the inside edge is close to the head, but maintains the integrity of the head. The inside edge extends parallel to a slider center line from a trailing edge of the head encapsulation layer to a position which is past the trailing slider edge by a selected distance. This maintains the head near the close point flying height of the slider, which occurs at the inside edge of the outer side rail when the air bearing surfaces have a cross curvature.

BRIEF DESCRIPTION OF THE DRAWINGS

FIG. 2b is a fragmentary, sectional view of the slider shown in FIG. 2a as seen from lines 2b—2b of FIG. 2a.

FIG. 4b is a graph illustrating the CRFH as a function of spindle rpm for the taper angles of FIG. 4a.

FIG. 10a is a plan view of the slider shown in FIG. 3a.

FIG. 10b is a fragmentary, sectional view of an inside rail edge of the slider shown in FIG. 10a.

FIG. 17b is an enlarged, fragmentary perspective view of a trailing end of an outer rail of the slider shown in FIG. 17a.

DETAILED DESCRIPTION OF THE PREFERRED EMBODIMENTS

Figure 1:
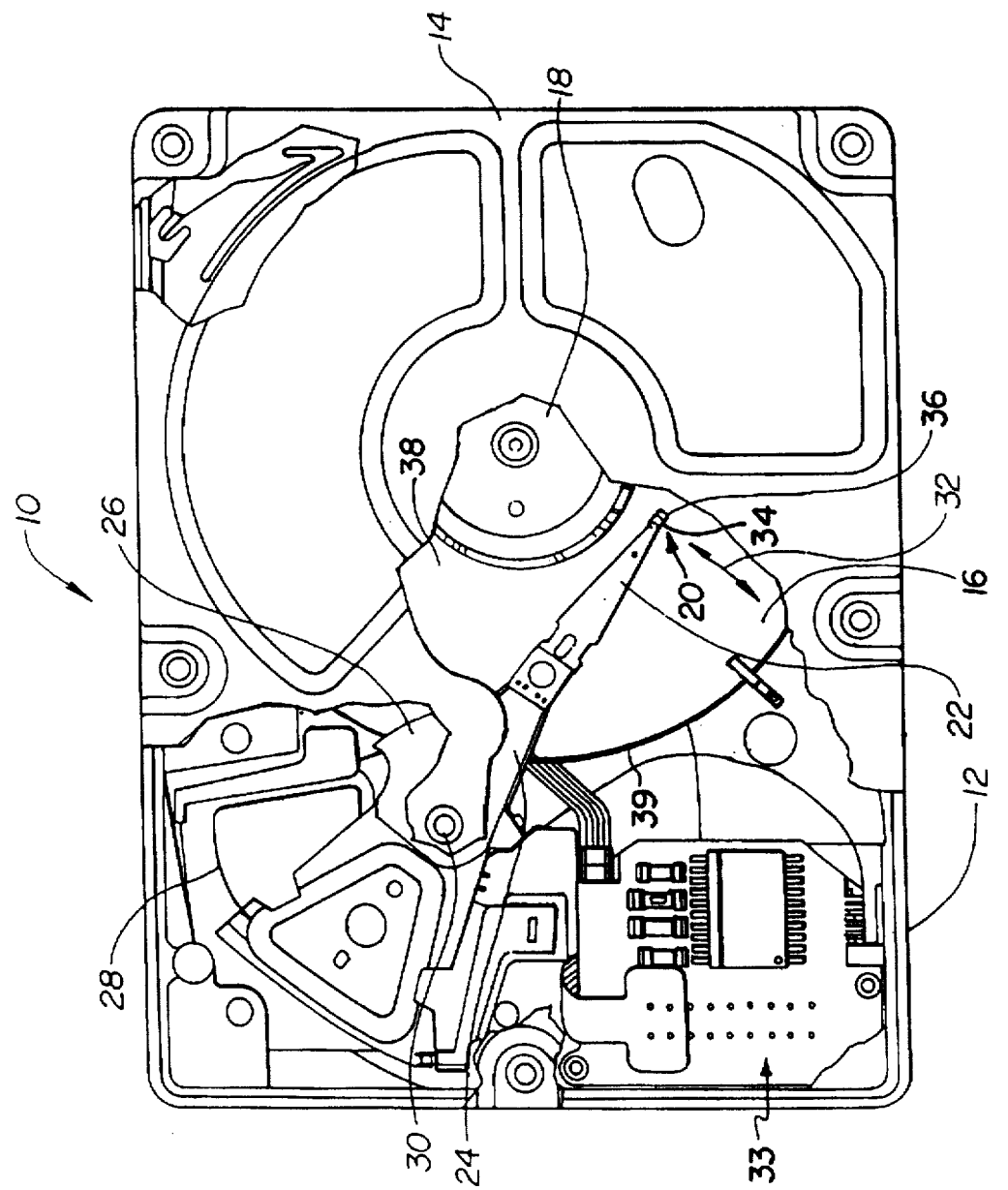
FIG. 1 is a top plan view of a disc drive data storage device in which the present invention is useful.

FIG. 1 is a plan view of a typical disc drive 10. Disc drive 10 includes a housing with a base 12 and a top cover 14 (portions of top cover 14 are removed for clarity). Disc drive 10 further includes a disc pack 16, which is mounted on a spindle motor (not shown) by a disc clamp 18. Disc pack 16 includes a plurality of individual discs which are mounted for co-rotation about a central axis. Each disc surface has an associated head gimbal assembly (HGA) 20 which is mounted to disc drive 10 for communication with the disc surface. In the example shown in FIG. 1, HGAs 20 are supported by load beam flexures 22 which are in turn attached to track accessing arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached heads 20 about a pivot shaft 30 to position heads 20 over a desired data track along an arcuate path 32 under the control of electronic circuitry 33. Each HGA 20 includes a gimbal 34 and a slider 36.

Figure 2B:
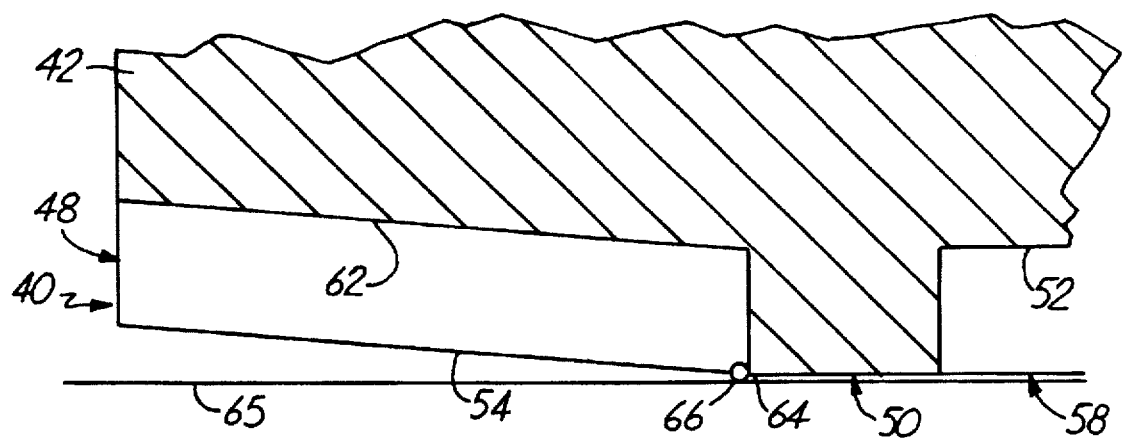
Figure 2A:
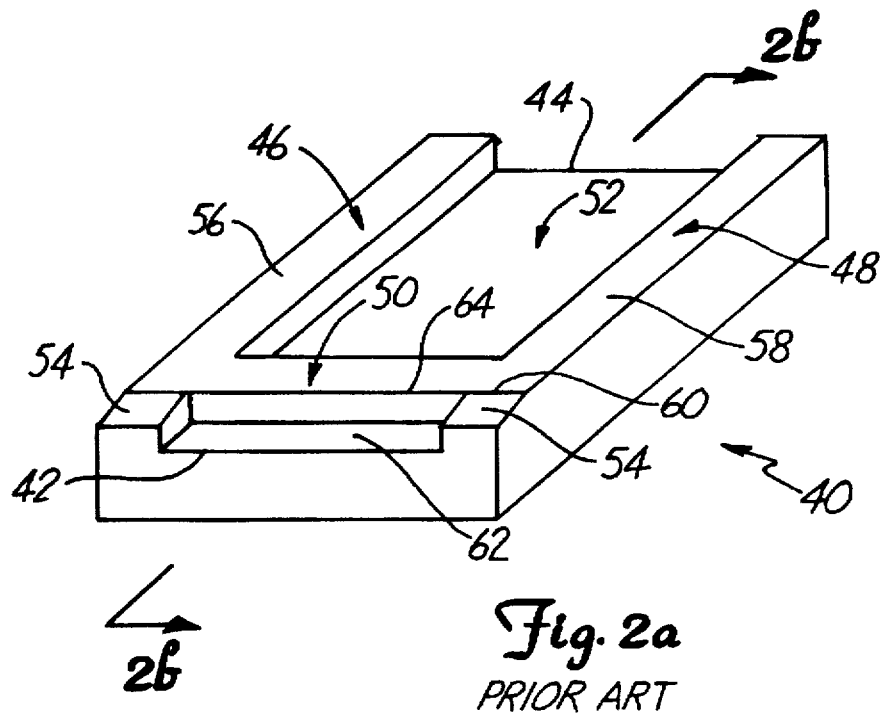
FIG. 2a is a perspective view of a slider of the prior art.

FIG. 2a is a perspective view of a slider of the prior art. Slider 40 includes a leading edge 42, a trailing edge 44, raised side rails 46 and 48, a raised cross rail 50, a subambient pressure cavity 52 and a leading taper 54. Side rails 46 and 48 extend from leading edge 42 to trailing edge 44 and form air bearing surfaces 56 and 58, respectively. Leading taper 54 extends from leading edge 42 to an intersection 60 with air bearing surface 56 and 58. This intersection is commonly referred to as a "taper break". A notch 62 is positioned within a central region of leading taper 54 and extends from leading edge 42 to cross rail 50.

FIG. 2b is a fragmentary, sectional view of slider 40 taken along lines 2b—2b of FIG. 2a, with the vertical scale enlarged ten times with respect to the horizontal scale. As shown in FIG. 2b, notch 62 defines a sharp leading edge 64 at the front of cross rail 50. The sharp leading edge 64 of cross rail 50 may scrape disc surface 65 and collect debris particles 66.

Figure 3B:
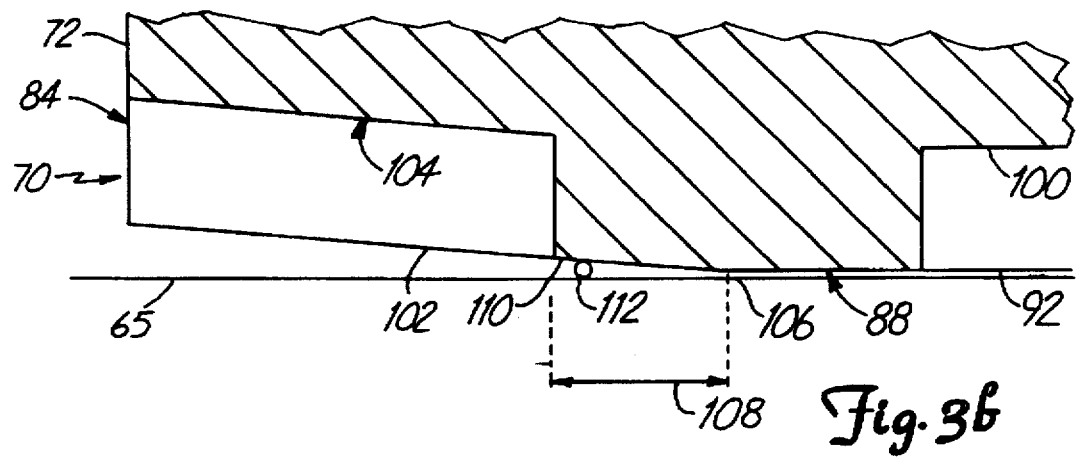
FIG. 3b is a fragmentary, sectional view of the slider shown in FIG. 3a as seen from lines 3b—3b.
Figure 3A:
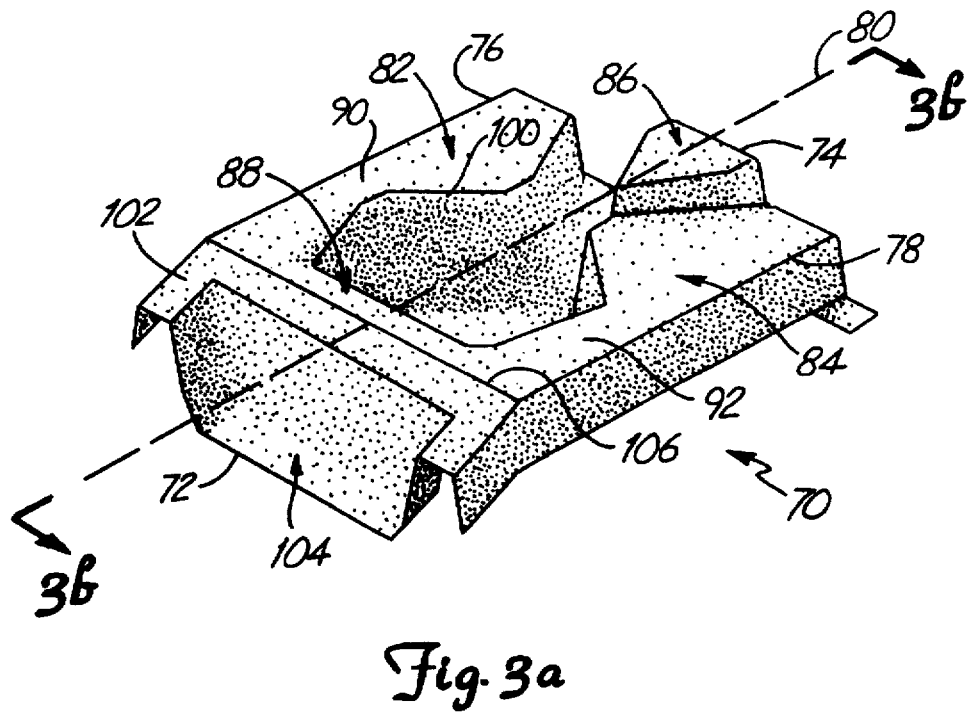
FIG. 3a is a computer-generated illustration of a notched leading taper slider configuration according to the present invention.

FIG. 3a is computer-generated illustration of the bearing surface of a slider according to the present invention. Slider 70 includes leading edge 72, trailing edge 74, inside edge 76, outside edge 78, and center line 80. Slider 70 further includes side rails 82 and 84, center island 86 and cross rail 88. Cross rail 88 extends between and is coplanar with side rails 82 and 84. Side rails 82 and 84 are positioned along inside and outside edges 76 and 78, respectively, and form air bearing surfaces 90 and 92, respectively. Side rail 82 is an "inner" rail which flies closest to the disc hub and side rail 84 is an "outer" rail which flies closest to the disc rim. Center island 86 is positioned along center line 80. A symmetric slider design allows either rail to be denominated as the outer rail by assigning the disc surface to be used as an "up facing" or "down facing" disc surface. Center island 86 supports a head (not shown) adjacent trailing edge 74 for communicating with the disc surface. In the embodiment shown in FIG. 3a, center island 86 does not extend all of the way from trailing edge 74 to cross rail 88. In an alternative embodiment, center island 86 is replaced with a center rail which extends to cross rail 88.

Slider 70 further includes subambient pressure cavity 100, lapped leading taper 102 and notch 104. Leading taper 102 extends from leading edge 72 to an intersection 106 with air bearing surfaces 90 and 92. Notch 104 is positioned within a central region of leading taper 102 and extends from leading edge 72 toward cross rail 88 and terminates prior to intersection 106. Slider 70 thus has a "notched taper" configuration. Subambient pressure cavity 100 and notch 104 are formed by ion milling, chemical etching, or Reactive Ion Etching (RIE) with a single masking and etching iteration. Notch 104 therefore has the same depth measured from leading taper surface 102, as subambient pressure cavity 100 has measured from bearing surfaces 90 and 92.

FIG. 3b is a fragmentary, sectional view of slider 70 taken along center line 80, with the vertical scale enlarged ten times with respect to the horizontal scale. Notch 104 terminates prior to intersection 106 a distance 108 that is sufficient to maintain a blunt edge 110 at the front of cross rail 88. Blunt edge 110 is less likely to damage disc surface 65 and collect debris particles 122 than the sharp edge 64 shown in FIG. 2b. For a thirty-series slider, notch 104 preferably terminates 0.5–4.5 mils from intersection 106. A thirty-series slider has a length of 1.25 millimeters and a width of 1.0 millimeters. For a fifty-series slider, notch 104 preferably terminates 0.5–5.5 mils from intersection 106. A fifty-series slider has a length of 2.00 millimeters and a width of 1.60 millimeters.

Figure 4A:
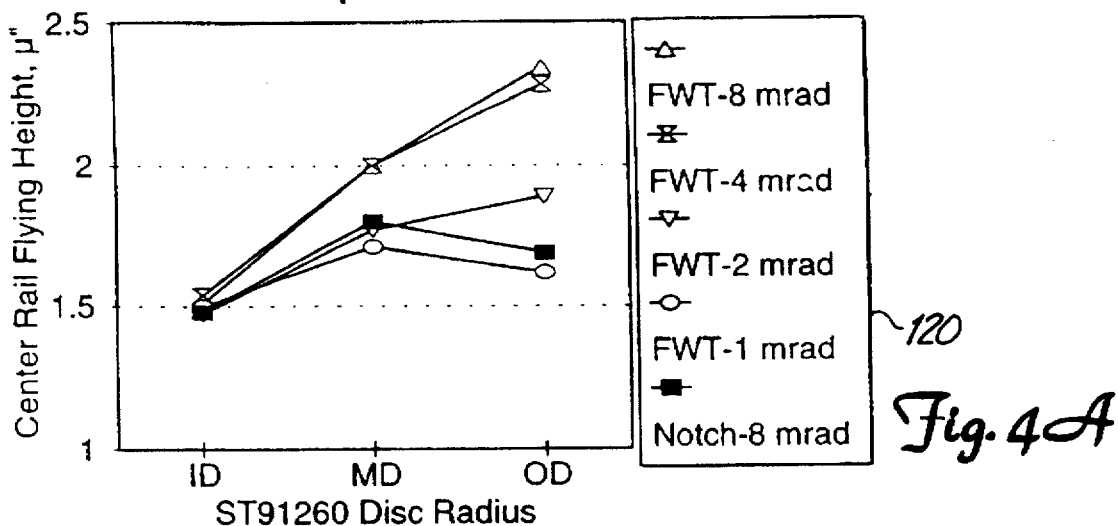
FIG. 4a is a graph illustrating center rail flying height (CRFH) profiles as a function of the angle of a leading taper.

FIG. 4a is a graph illustrating the center rail flying height (CRFH) profiles as a function of the angle of the leading taper. The flying height was measured at the disc inner diameter (ID), middle diameter (MD) and outer diameter (OD). The "30%" indicates that the slider is a thirty-series slider. The ST91260 disc drive noted in FIG. 4a is a portable disc drive with a 2.5 inch nominal disc diameter. The recording head was mounted on a center rail or "island", with the CRFH indicating the flying height of the center rail. The CRFH is near the recording head, but located upstream on the reflective ceramic slider material. The recording head was formed within an encapsulation layer of transparent Alumina. The transparent Alumina cannot be measured on an optically based flying height tester. Therefore, the nearby CRFH location was measured instead. Variations in the CRFH are taken as representative of variations in the actual recording head flying height.

FIG. 4a shows the CRFH for sliders having various angles of the leading taper. Legend 120 indicates that the CRFH was measured for four sliders having a full-width leading taper and no notch. These sliders had a taper angle of one milliradian (FWT-1 mrad), two milliradians (FWT-2 mrad), four milliradians (FWT-4 mrad) and eight milliradians (FWT-8 mrad). The CRFH was also measured with a slider having a notch in the leading taper and a taper angle of 8 milliradians (Notch-8 mrad). The advantage of the shallow taper angle of one milliradian is that the CRFH at the OD is similar to the CRFH at the ID. Therefore, high recording bit density can be used at the disc OD to increase the data storage capacity of the disc drive. The same advantage in storage capacity can be realized by notching the 8.0 milliradian taper consistent with the current invention, as shown in FIG. 4a.

Figure 4B:
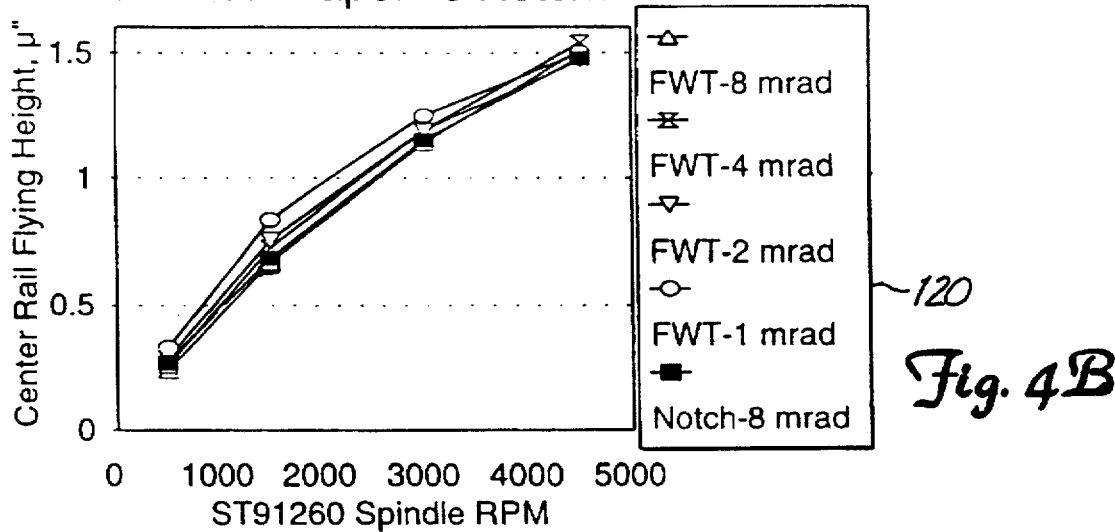

FIG. 4b is a graph illustrating the CRFH as a function of spindle rpm for the taper angles plotted in FIG. 4a. As shown in FIG. 4b, providing a notch in the full-width leading taper does not degrade take-off performance as the spindle speed increases from 0 to 5,000 rpm. The sliders having an 8.0 milliradian taper angle clear 1.0 microinches of disc roughness at about 2,500 rpm regardless of whether a notch is present.

Figure 5:
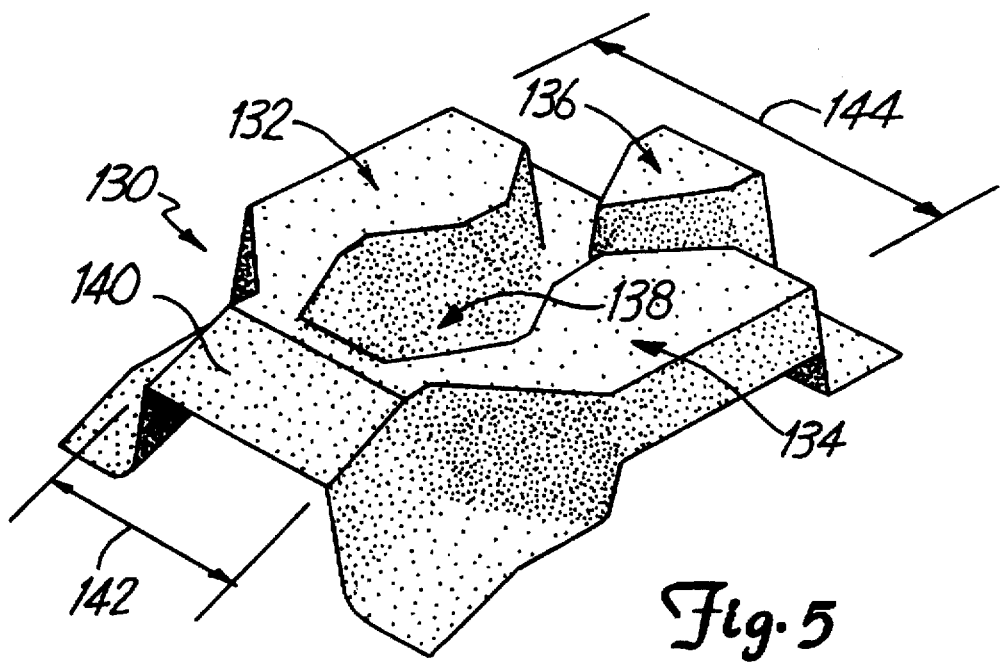
FIG. 5 is a computer-generated illustration of an air bearing surface of a slider having a narrow leading taper configuration.

FIG. 5 is a computer-generated illustration of an air bearing surface of a slider having a narrow leading taper configuration. Slider 130 includes side rails 132 and 134, center rail 136, cross rail 138 and leading taper 140. The air bearing surface has a width 142 at leading taper 140 which is substantially smaller than the width 144 downstream of taper 140.

Figure 6:
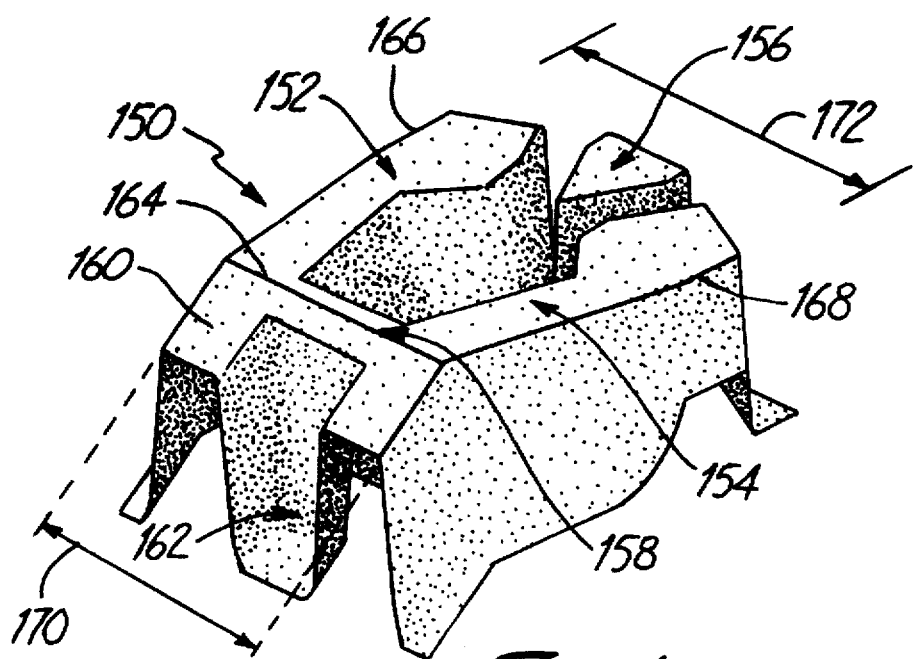
FIG. 6 is a computer-generated illustration of a slider which is a combination of the notched leading taper configuration shown in FIG. 3a and the narrow leading taper configuration shown in FIG. 5.

FIG. 6 is a computer-generated illustration of a slider which is a combination of the notched leading taper configuration shown ill FIG. 3a and the narrow leading taper configuration shown in FIG. 5. Slider 150 includes side rails 152 and 154, center island 156, cross rail 158 and leading taper 160. Leading taper 160 includes a notch 162 which terminates prior to an intersection 164 between leading taper 160 and the air bearing surfaces formed by side rails 152 and 154. Side rails 152 and 154 have outside edges 166 and 168 which define the width of the overall air bearing. The air bearing has a width 170 along leading taper 160 and a width 172 downstream of leading taper 160, near the trailing end. Width 170 is substantially smaller than width 172.

Figure 7:
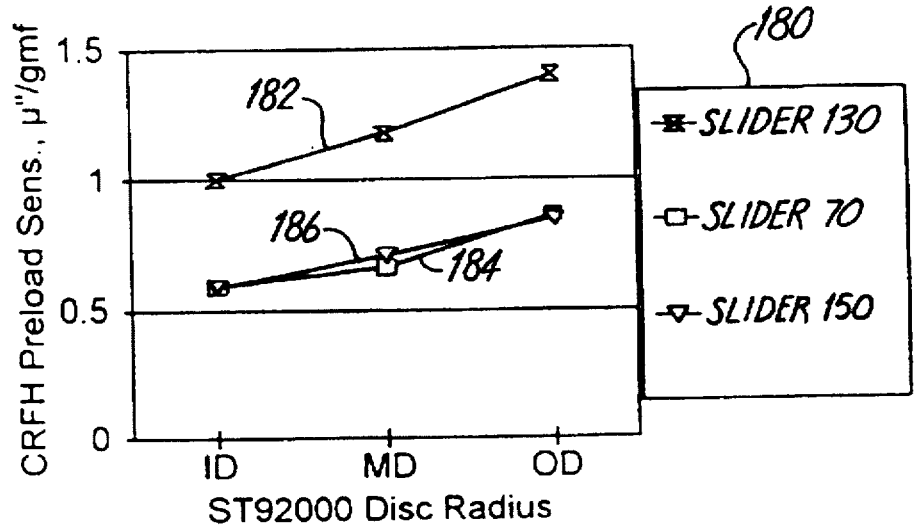
FIG. 7 is a graph which illustrates sensitivity of the CRFH to the preload force.

The flying heights of the sliders shown in FIGS. 3a, 5 and 6 are similar from a practical point of view. However, these sliders have much different sensitivities to variations in manufacturing parameters. FIG. 7 is a graph which illustrates sensitivity of the CRFH to the preload force. As shown in legend 180, line 182 represents the preload sensitivity of slider 130, shown in FIG. 5, line 184 represents the preload sensitivity of slider 70, shown in FIG. 3a, and line 186 represents the preload sensitivity of slider 150, shown in FIG. 6. Slider 130 has a poor CRFH preload sensitivity due to a low suction force developed in the narrow subambient pressure cavity. The net loading on slider 130 is therefore reduced, which requires narrow side rails to obtain a desired CRFH. The narrow side rails reduce peak pressure under the rails, which results in a lower bearing stiffness than wide rails at high pressure.

Figure 8:
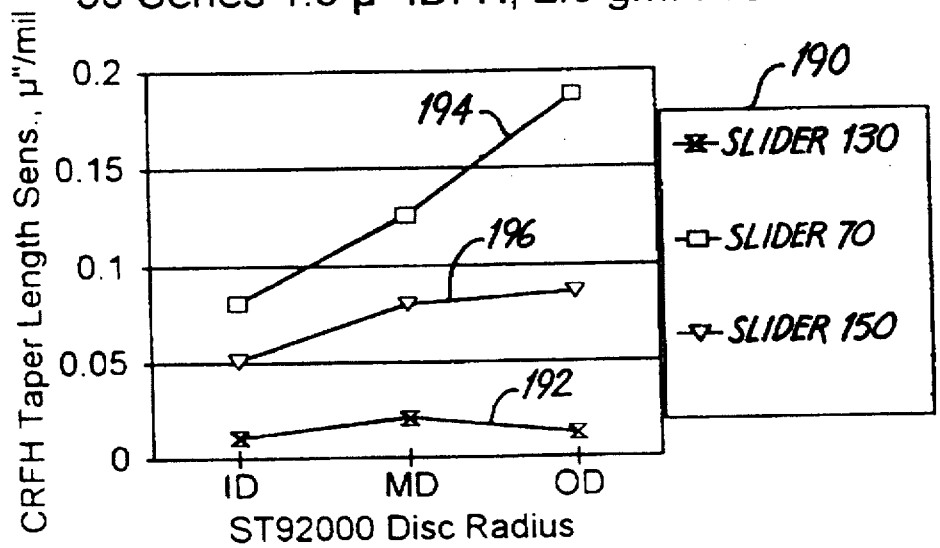
FIG. 8 is a graph illustrating the sensitivity of the CRFH to the length of the leading taper.

FIG. 8 is a graph illustrating the sensitivity of the CRFH to the length of the leading taper. As shown in legend 190, line 192 represents the taper length sensitivity of slider 130, line 194 represents the taper length sensitivity of slider 70 and line 196 represents the taper length sensitivity of slider 150. The notched taper configuration of slider 70, shown in FIG. 3a has a poor taper length sensitivity due to the short length of the taper surface on the cross rail, downstream of the notch. This short taper length pressurizes similarly to the full length taper portions at the leading edges of the side rails. For a given variation in taper length, the percentage variation of the short taper length along the cross rail is about 2.7 times greater than the variation of the full taper length at the leading edges of the side rails. A given variation in the taper length therefore affects the pressurization on the short taper area to a greater degree than on the longer taper areas.

Figure 9:
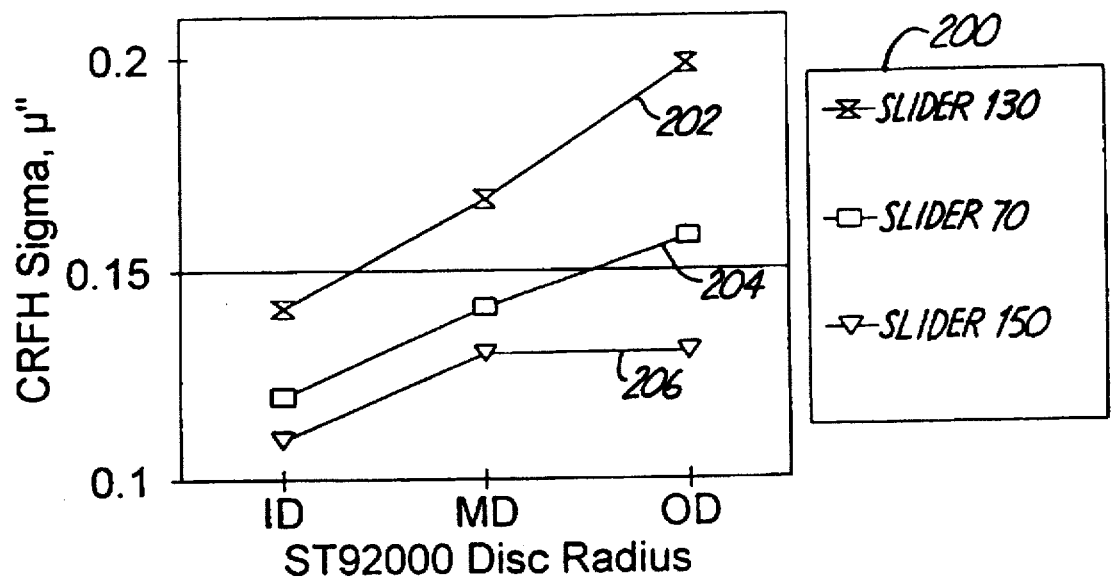
FIG. 9 is graph which illustrates the overall sensitivity of the CRFH to manufacturing parameters.

FIG. 9 is graph which illustrates the overall sensitivity of the CRFH to manufacturing parameters. As shown in legend 200, line 202 represents the overall sensitivity of slider 130, line 204 represents the overall sensitivity of slider 70 and line 206 represents the overall sensitivity of slider 150. The combined taper configuration of slider 150 has the least overall sensitivity of CRFH to manufacturing parameters. This results in the smallest standard deviation ("sigma") of the CRFH for a given set of standard deviations of the manufacturing parameters. The combined taper configuration has the lowest CRFH sigma because it is relatively insensitive to both preload and taper length variations. Therefore, it is a preferred embodiment of the present invention.

Figure 10A:
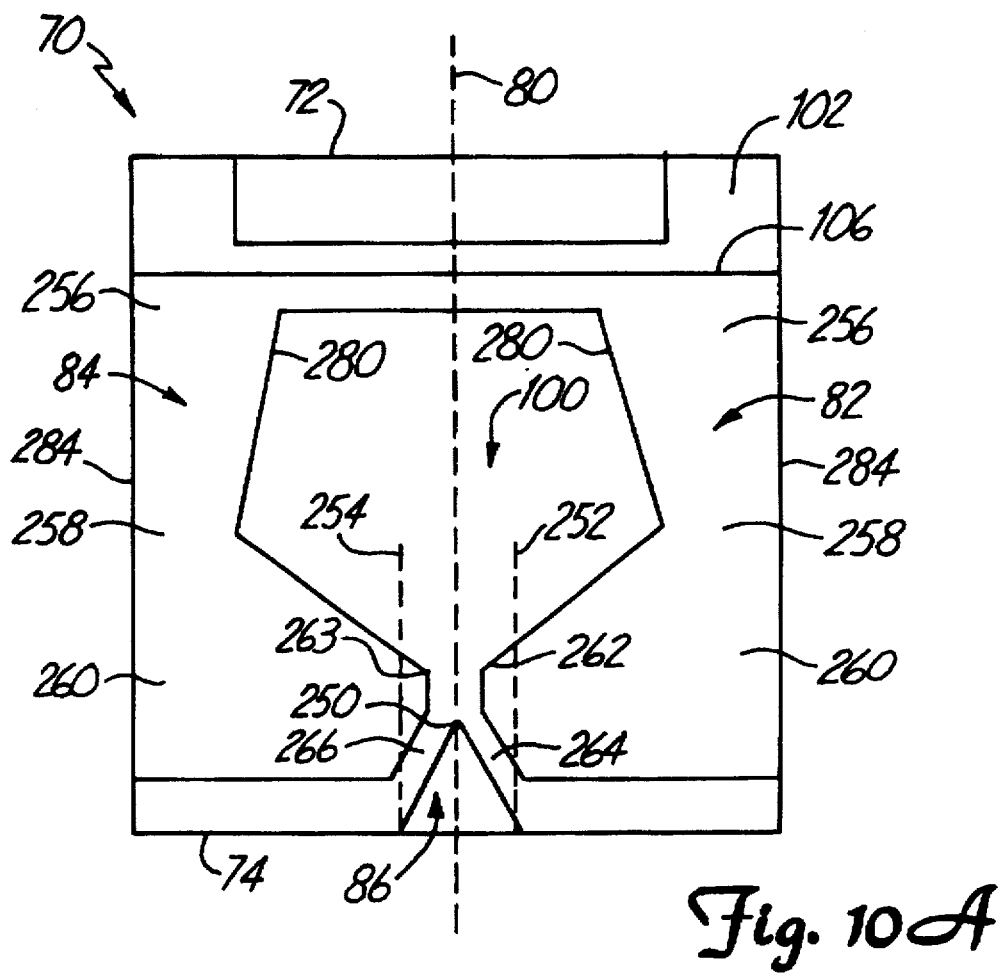

The sliders shown in FIGS. 3a, 5 and 6 have a center island at the trailing end of the slider for supporting the recording head. The side rails are relatively wide and encroach upon the center island. FIG. 10a is a plan view of slider 70, shown in FIG. 3a. Center island 86 widens from an apex 250 toward a maximum width at trailing edge 74. The maximum width of center island 86 defines first and second reference lines 252 and 254 which are parallel to slider center line 80. Side rails 82 and 84 each include a leading portion 256, a waist portion 258, and a trailing portion 260. The trailing portion 260 of side rail 82 widens from waist portion 258 toward slider center line 80 to a location 262 which is between reference line 252 and slider center line 80. Similarly, trailing portion 260 of side rail 84 widens from waist portion 258 toward slider center line 80 to a location 263 which is between reference line 254 and slider center line 80. A pair of channels 264 and 266 extend from subambient pressure cavity 100 to trailing edge 74, between center island 86 and trailing portions 260 of side rails 82 and 84, respectively. In a preferred embodiment, channels 264 and 266 have a depth which is equal to the depth of subambient pressure cavity 100, as measured from the air bearing surfaces formed by side rails 82 and 84.

Side rails 82 and 84 have inside edges 280 and outside edges 284. Due to limitations in the process of etching subambient pressure cavity 100, there is a transition region along the side walls between the air bearing surfaces formed by side rails 82 and 84 and the floor of subambient pressure cavity 100. The transition region is not etched to the full depth of the cavity, but rather has a sloping profile with a characteristic width which is dependent upon the ion milling, chemical etching or RIE process characteristics.

Figure 10B:
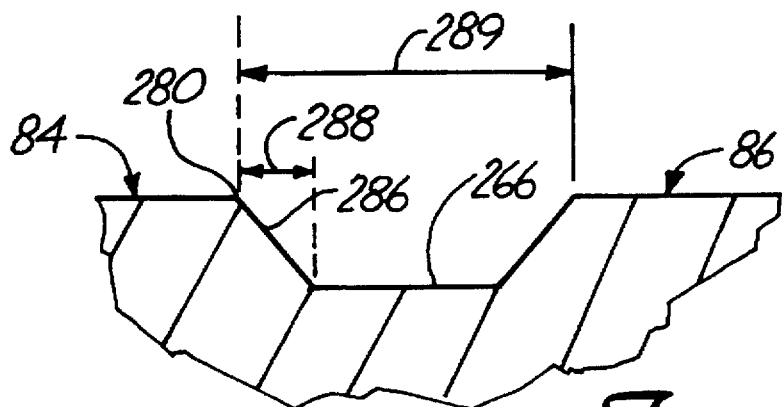

FIG. 10b is a fragmentary, sectional view of inside edge 280 which illustrates the transition region along the side wall in greater detail. The etching process forms a sloped side wall 286 between the surface of rail 84 and subambient pressure cavity 100. The profile of wall 286 has a characteristic width 288. Inside edges 280 approach center island 86 to a distance 289 which is no less than the width of two etched wall profile widths 288 such that channels 264 and 266 maintain a depth at the middle of the channels which is equal to the depth of subambient pressure cavity 100. In one embodiment, channels 264 and 266 have a width of 0.8 to 8.0 mils, and preferably have a width of 5.2 mils.

Figure 11A:
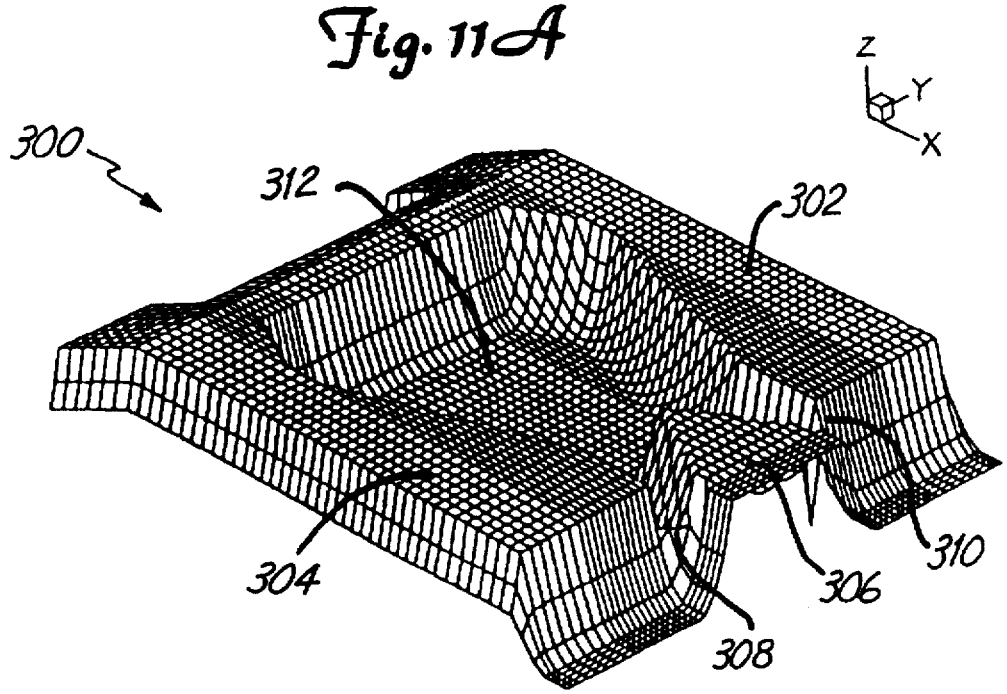
FIGS. 11a and 11b are computer-generated perspective views at different angles of a slider having shallow channels between side rails and a center island.
Figure 11B:
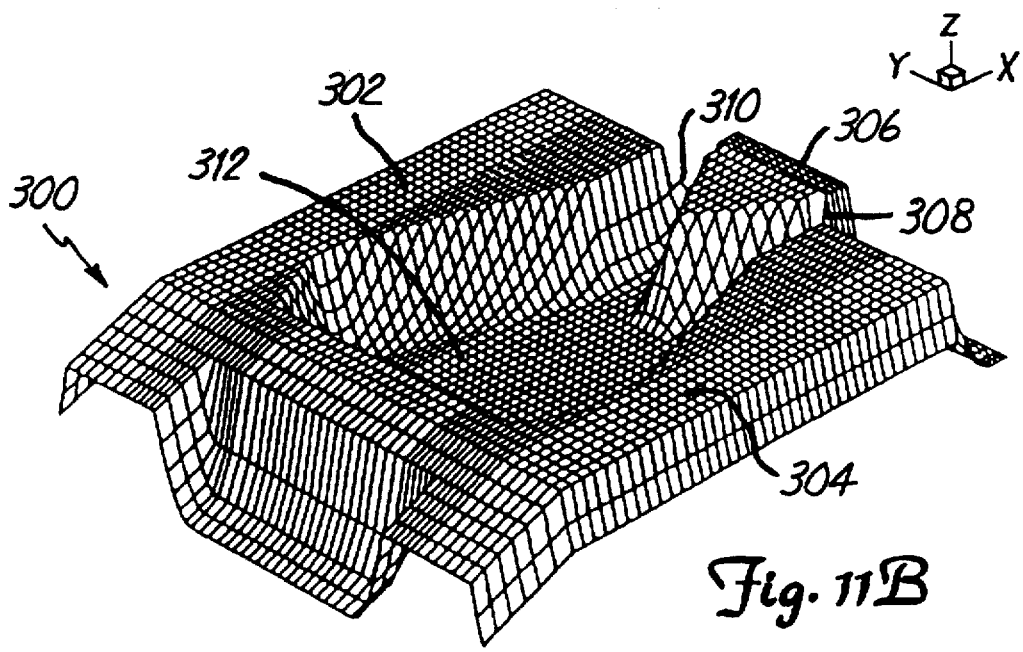
Figure 11C:
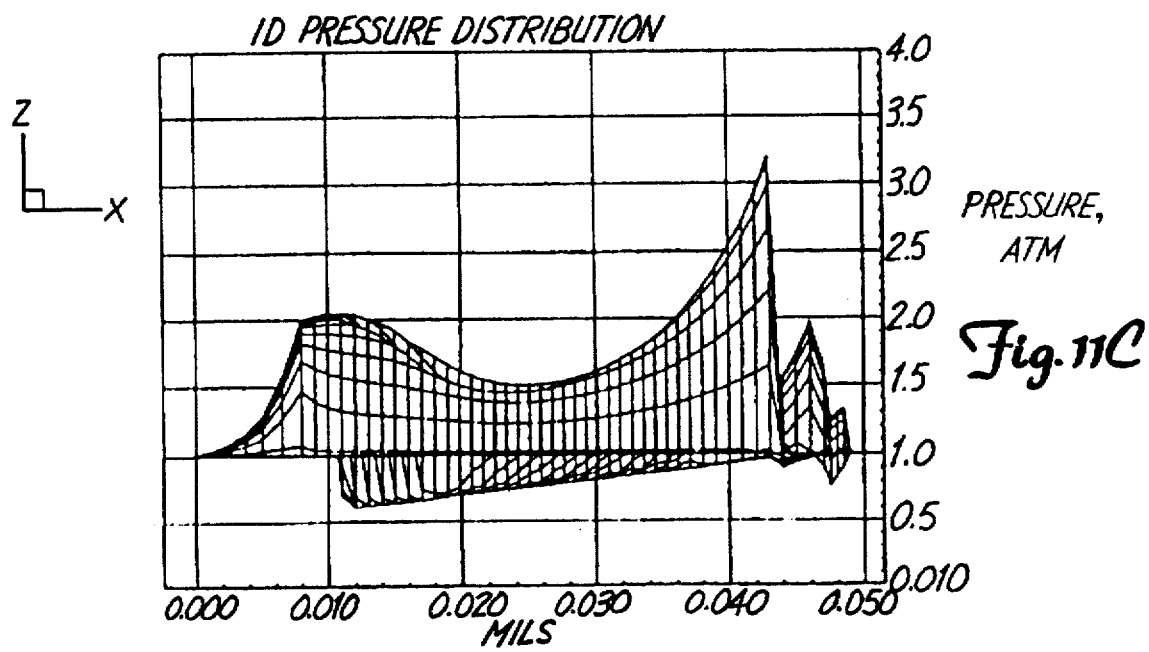
FIGS. 11c and 11d show the pressure distribution profiles of the slider shown in FIGS. 11a and 11b at the outer and inner disc diameters.
Figure 11D:
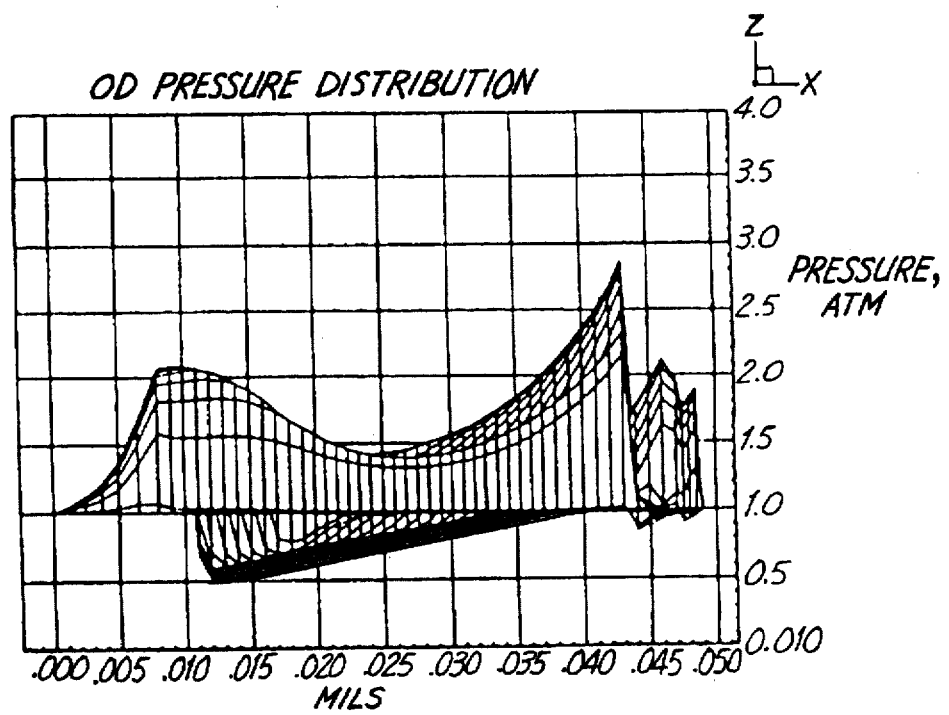

FIGS. 11a and 11b are computer-generated perspective views of a slider 300 which has shallow cavity areas rather than full-depth channels. Slider 300 has side rails 302 and 304 which are positioned close to center island 306. The etched wall profiles of side rails 302 and 304 and center island 306 join together, which results in shallow cavity areas 308 and 310. Shallow cavity areas 308 and 310 restrict the flow of air at atmospheric pressure into subambient pressure cavity 312 from the trailing end of slider 300. Therefore, the vacuum drawn in subambient pressure cavity 312 is relatively large, about 0.65 atmospheres at the disc inner diameter, as shown by the pressure distribution profile in FIG. 11c, and about 0.5 atmospheres an the disc outer diameter, as shown by the pressure distribution profile in FIG. 11d.

Figure 12A:
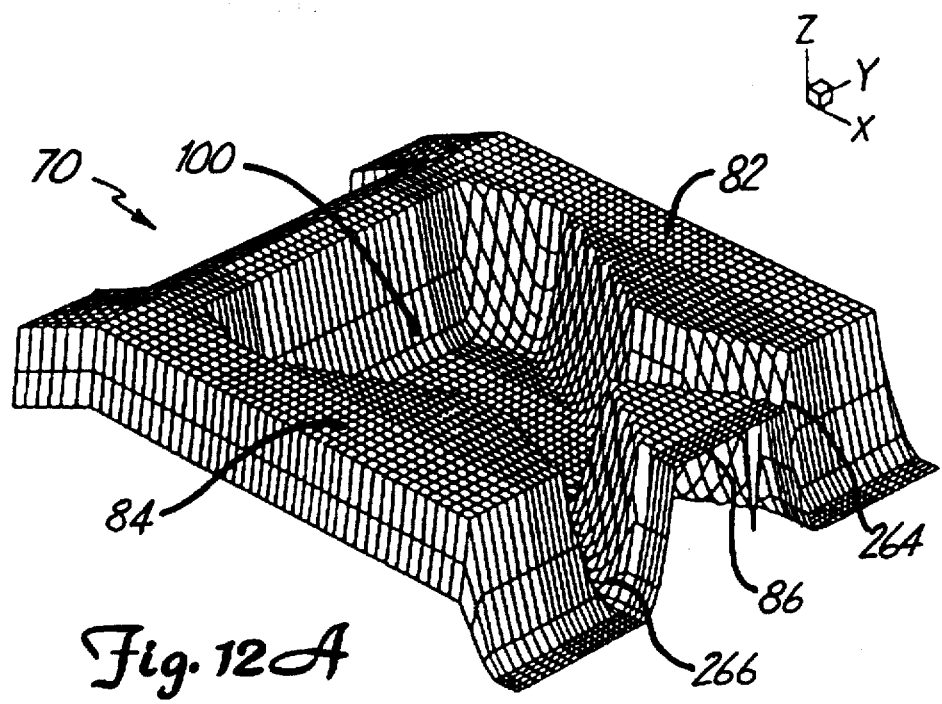
FIGS. 12a and 12b are computer-generated perspective views at different angles of the slider shown in FIG. 3a having full-depth channels between the side rails and the center island.
Figure 12B:
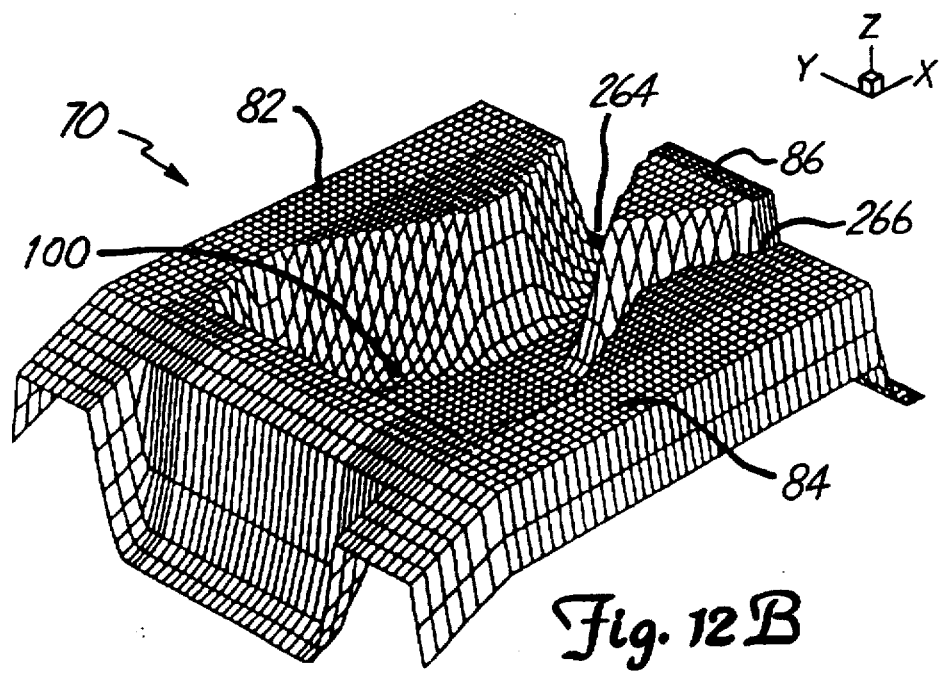
Figure 12C:
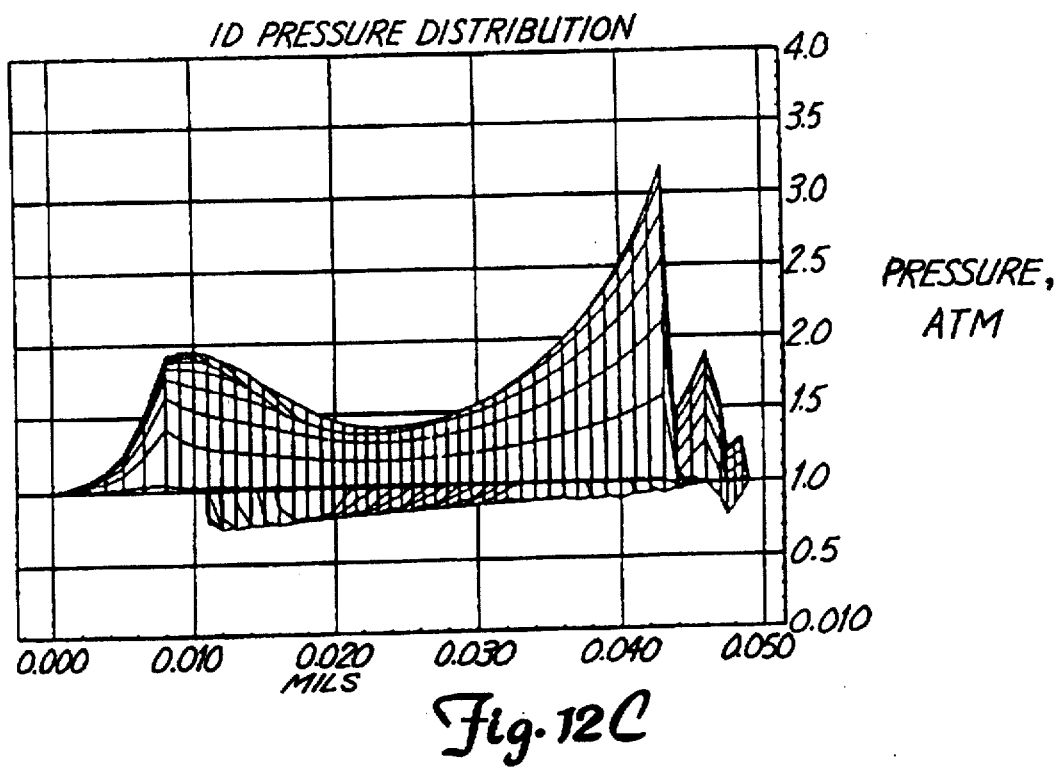
FIGS. 12c and 12d show the pressure distribution profiles of the slider Shown in FIGS. 12a and 12b at the outer and inner disc diameters.
Figure 12D:
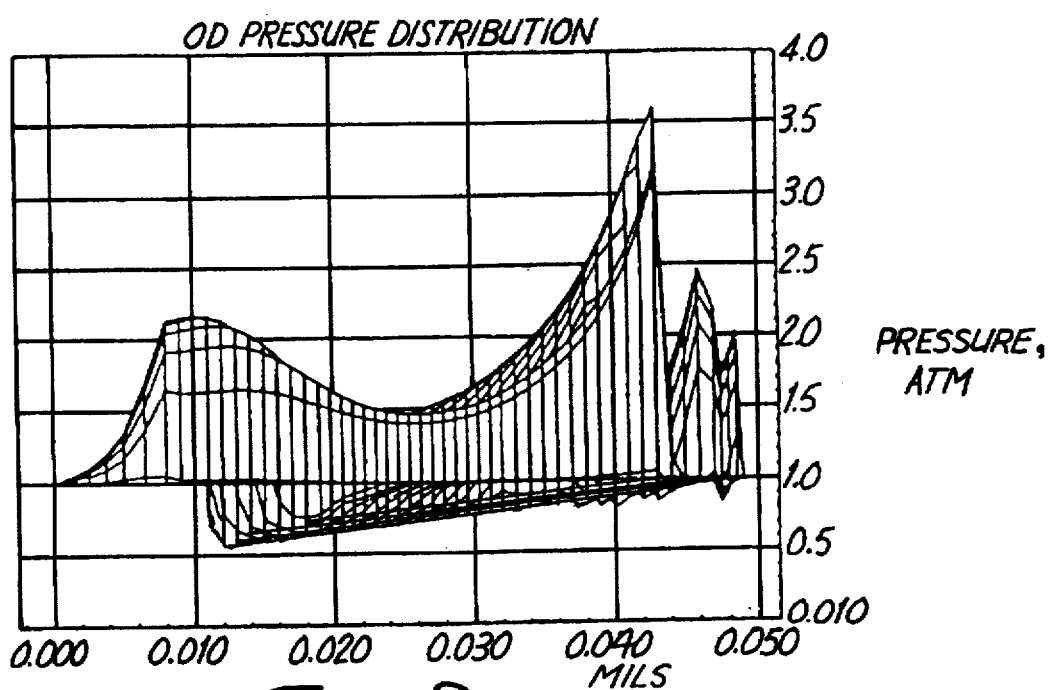

FIGS. 12a and 12b are computer-generated perspective views of slider 70 at different angles. Slider 70 has full-depth channels 264 and 266 between side rails 82 and 84 and center island 86. The air can flow freely from the trailing end of the slider into subambient pressure cavity 100, since the full cavity depth at the center of channels 264 and 266 offers less resistance to air flow than the shallow areas 308 and 310 shown in FIGS. 11a and 11b. Therefore, the vacuum drawn by subambient pressure cavity 100 is reduced to about 0.75 atmospheres at the disc inner diameter, as shown in FIG. 12c, and about 0.60 atmospheres at the disc outer diameter, as shown in FIG. 12d.

The reduced vacuum dram by slider 70 allows a slightly narrower rail width to support the bearing load at the desired inner diameter flying height. Therefore, the subambient pressure cavity 100 is larger and develops a self-loading or "suction" force more efficiently. For example, slider 300 shown in FIGS. 11a and 11b develop 0.82 to 1.06 gmf of suction force from the disc inner diameter to the disc outer diameter, which represents a change in the net bearing load of only 0.2 gmf. Slider 70 shown in FIGS. 12a and 12b develops 0.73 to 1.19 gmf of suction force from the disc inner diameter to the disc outer diameter, which represents a change in net bearing load of 0.46 gmf.

Figure 13A:
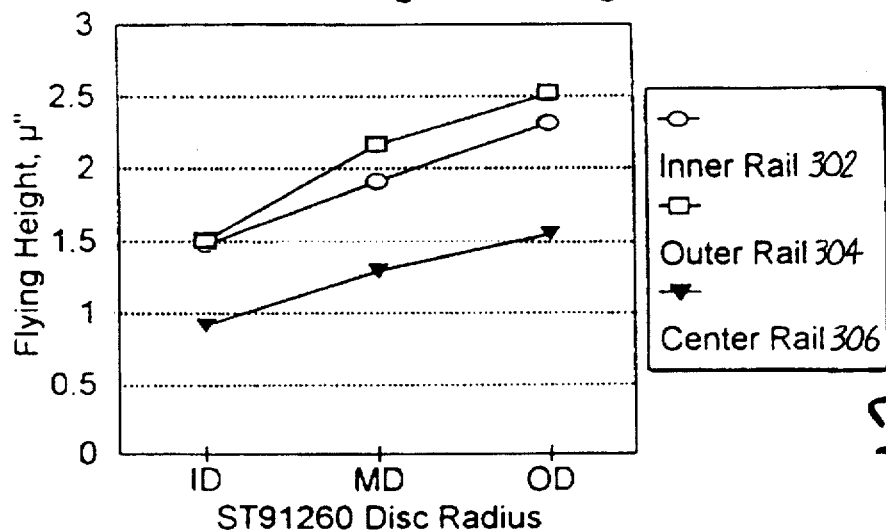
FIGS. 13a and 13b are graphs which illustrate the flying heights of the slider shown in FIGS. 11a and 11b and in FIGS. 12a and 12b, respectively.
Figure 13B:
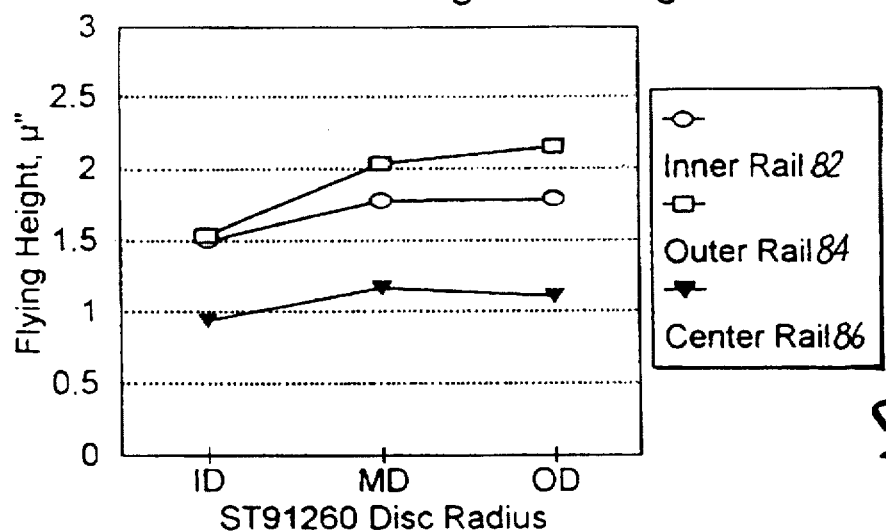

FIGS. 13a and 13b are graphs which illustrate the flying heights of the inner, outer and center rails of sliders 300 and 70, respectively, at the inner diameter (ID), middle diameter (MD) and outer diameter (OD) of the disc. As shown in FIG. 13a, the flying height of center rail 306 of slider 300 increases 0.65 microinches from the disc ID to the disc OD. As shown in FIG. 13b, the flying height of center rail 86 of slider 70 increases only 0.2 microinches from the disc ID to the disc OD. This is in part due to the more efficient suction characteristics achieved by the full-depth channels 264 and 266.

Figure 14A:
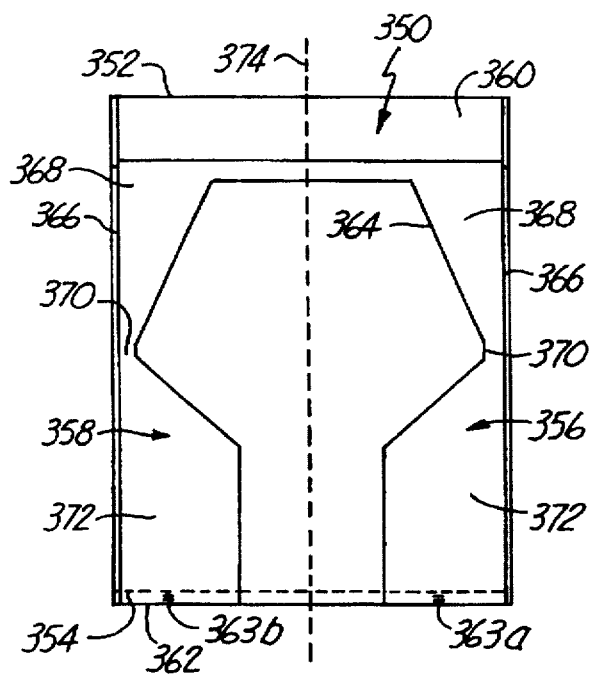
FIGS. 14a–14c are plan views of sliders having outside rail edges with progressively increasing inward offsets.

FIGS. 14a–14c and 15a–15c show the effect of offsetting the outside edges of the side rails inward toward the center of the slider along the leading portions of the side rails, but maintaining the full width of the leading taper. FIG. 14a is a plan view of slider 350. Slider 350 includes leading edge 352, trailing edge 354, inner rail 356, outer rail 358 and full-width taper 360. Encapsulation layer 362 is attached to trailing edge 354 and supports recording heads 363a and 363b at the trailing end of inner rail 356 and at the trailing end of outer rail 358. Recording head 363b at the trailing end of outer rail 358 is the active recording head in the disc drive. Recording head 363a at the trailing end of inner rail 356 is not activated but provides redundancy in the head wafer manufacturing process, thereby increasing the process yield. Since a symmetric slider design allows either rail to be denominated as the outer rail by assigning the disc surface to be used as an "up facing" or "down facing" disc surface, a symmetric slider design takes full advantage of the improved wafer process yield offered by two heads per slider. Inner rail 356 and outer rail 358 have inside edges 364, outside edges 366, a leading portion 368, a waist portion 370 and trailing portion 372. Slider 350 further includes a center line 374. In FIG. 14a, outside edge 366 remains parallel with center line 374 along leading portion 368.

Figure 14B:
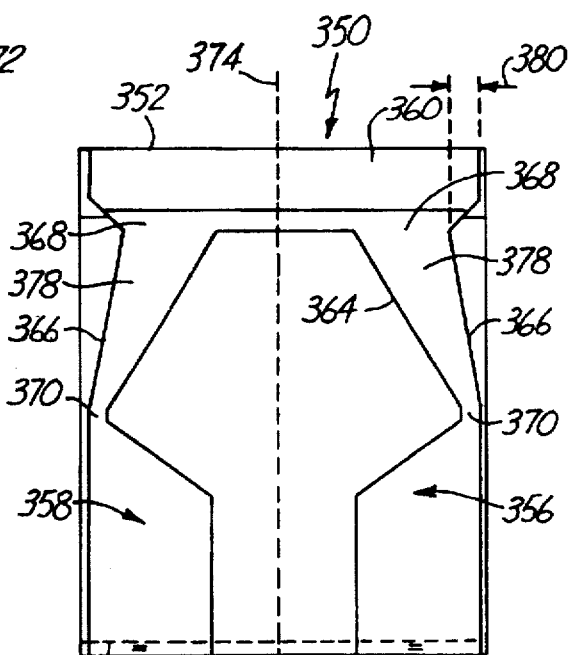

In FIG. 14b, outside edges 366 are offset toward center line 374. Outside edges 366 converge toward one another along leg portion 378, which extends from waist portion 370 to leading portion 368. Outside edges 366 then diverge from leg portion 378 along leading portion 368. In FIG. 14b, outside edges 366 have an offset 380 of 5.0 mils along leg portion 378. Similarly, inside edges 364 converge toward one another along leg portion 378 from waist portion 370 to leading portion 368.

Figure 14C:
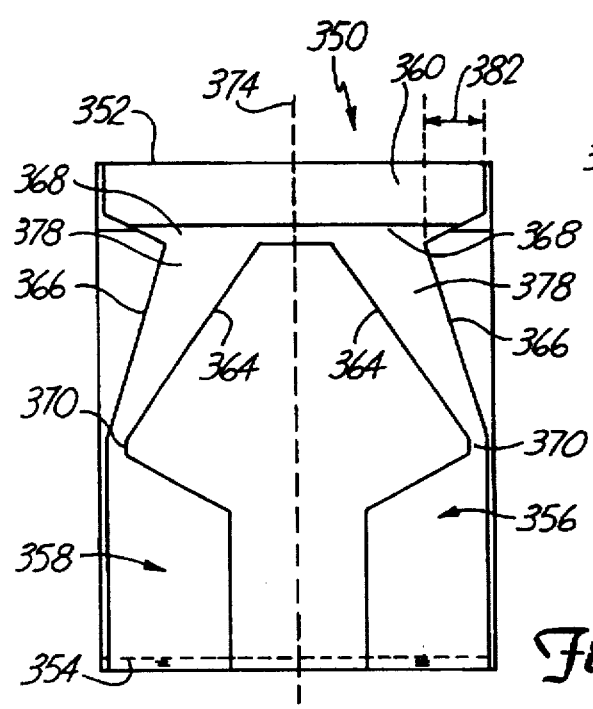

In FIG. 14c, outside edges 366 have an offset 382 of 10.0 mils along leg portions 378. Offsetting the outside edges 366 of rails 356 and 358 toward the center of slider 350 results in the disc tangential velocity intersecting the leg portions 378 at an angle. This "angled leading rail" configuration results in reduction of the flying height at the disc middle diameter (MDFH), thereby improving the recording bit density on the middle data tracks in the disc drive. The middle diameter flying height is commonly quantified relative to the inner diameter flying height (IDFH) and the outer diameter flying height (ODFH) by a "hump" parameter, where:

$$Hump=MDFH-[(IDFH+ODFH)/2]$$

The hump reflects a deviation of the middle diameter flying height from an ideal straight-line flying height profile between the inner diameter flying height and the outer diameter flying height.

Figure 15A:
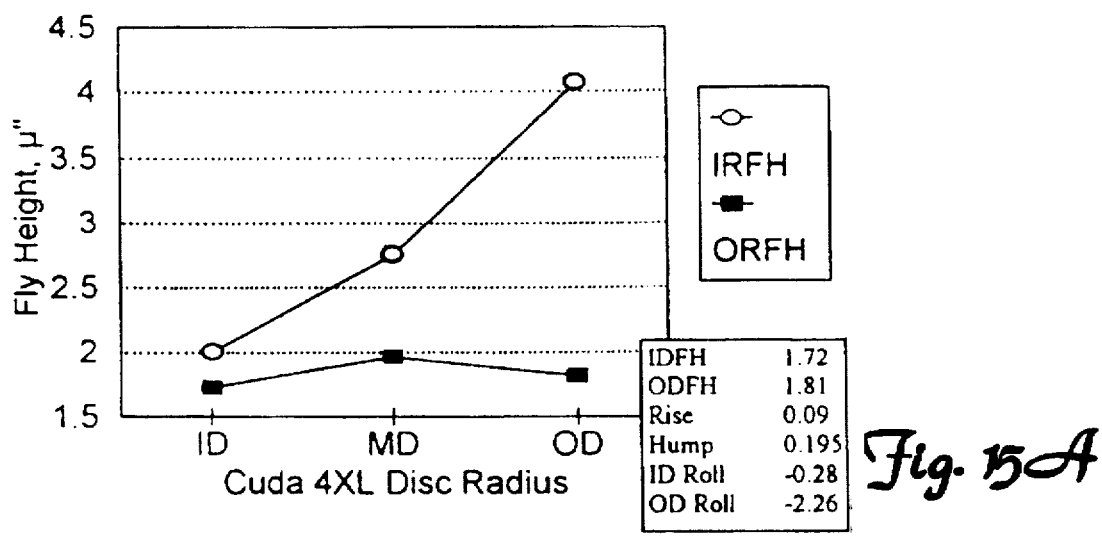
FIGS. 15a–15c are graphs which show the effects on flying height from offsetting the outside edges.
Figure 15B:
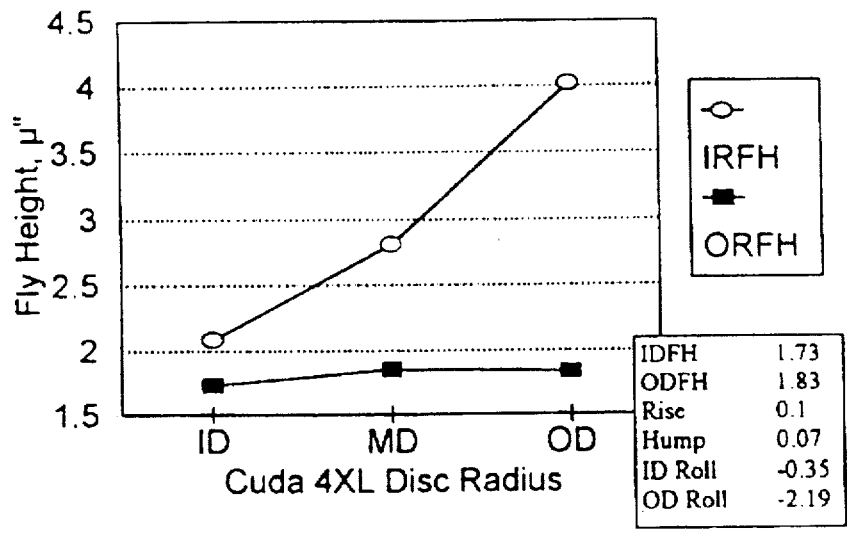
Figure 15C:
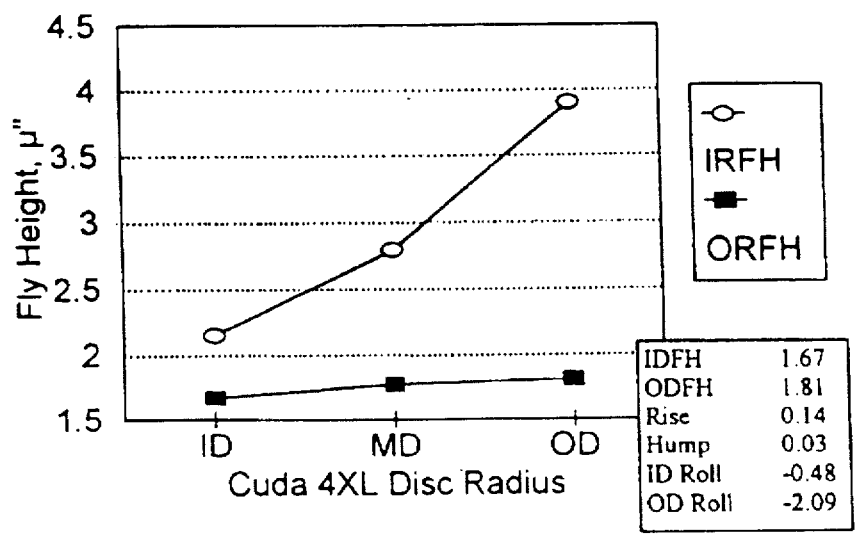

FIGS. 15a–15c are graphs which illustrate the IDFH, ODFH and MDFH of the inner and outer rails of the sliders shown in FIGS. 14a–14c, respectively. The outer rail flying height ("ORFH") is tested on the reflective slider substrate somewhat forward of the transparent Alumina head encapsulation layer 362. FIGS. 15a–15c show that offsetting the outer edge of the side rails from 0 to 10.0 mils reduces the hump from 0.195 microinches to 0.030 microinches, which thereby improves the recording capacity of the disc drive.

Figure 16:
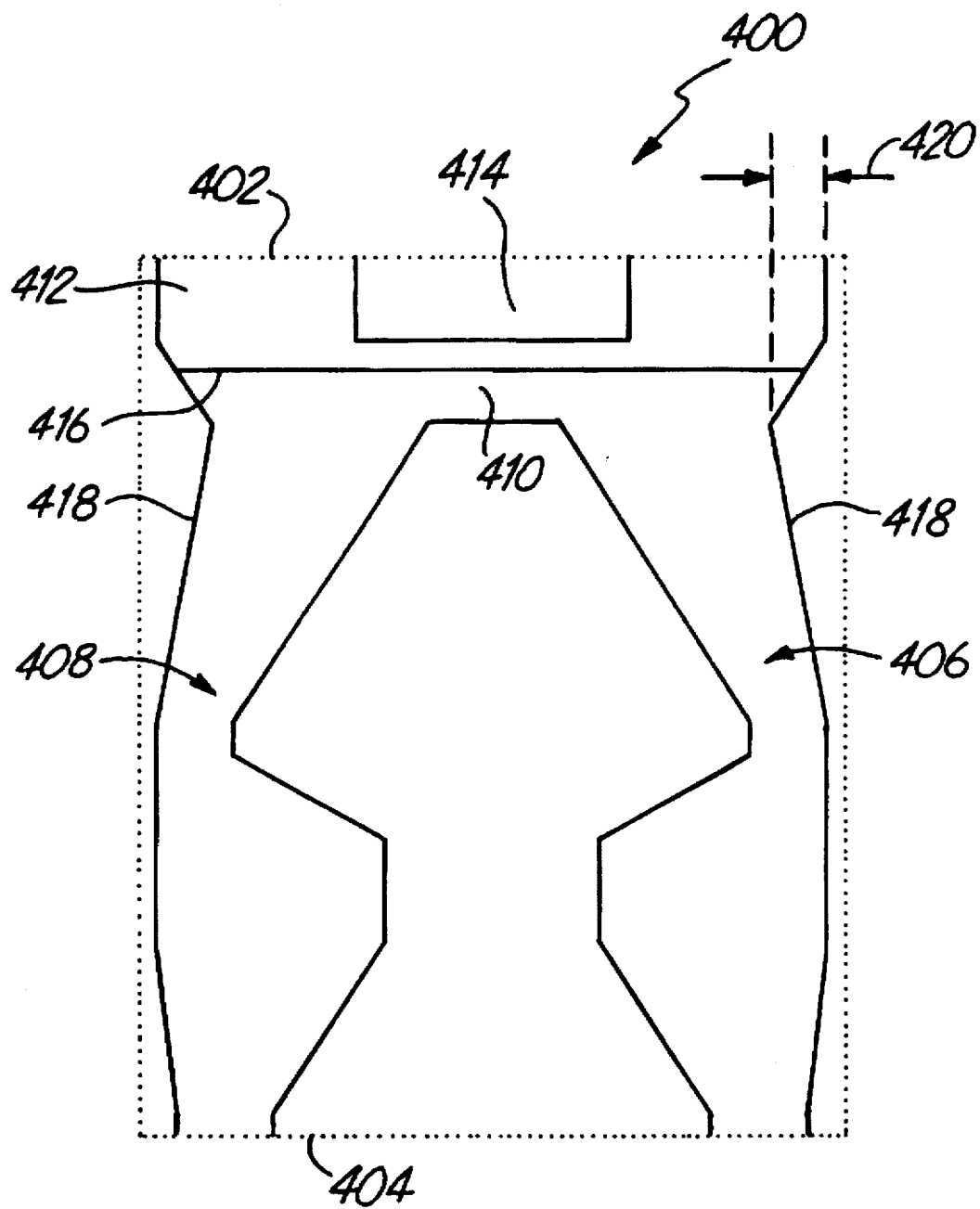
FIG. 16 is a plan view of a slider according to another alternative embodiment of the present invention.

FIG. 16 is a plan view of a slider 400 according to another alternative embodiment of the present invention. Slider 400 includes leading edge 402, trailing edge 404, inner rail 406, outer rail 408, cross rail 410, leading taper 412 and notch 414. Notch 414 extends from leading edge 402 to cross rail 410 and terminates prior to an intersection 416 between leading taper 412 and the air bearing surfaces formed by rails 406 and 408. In addition, rails 406 and 408 include outside edges 418 having an offset 420 similar to the offsets shown in FIGS. 14b and 14c.

Figure 17A:
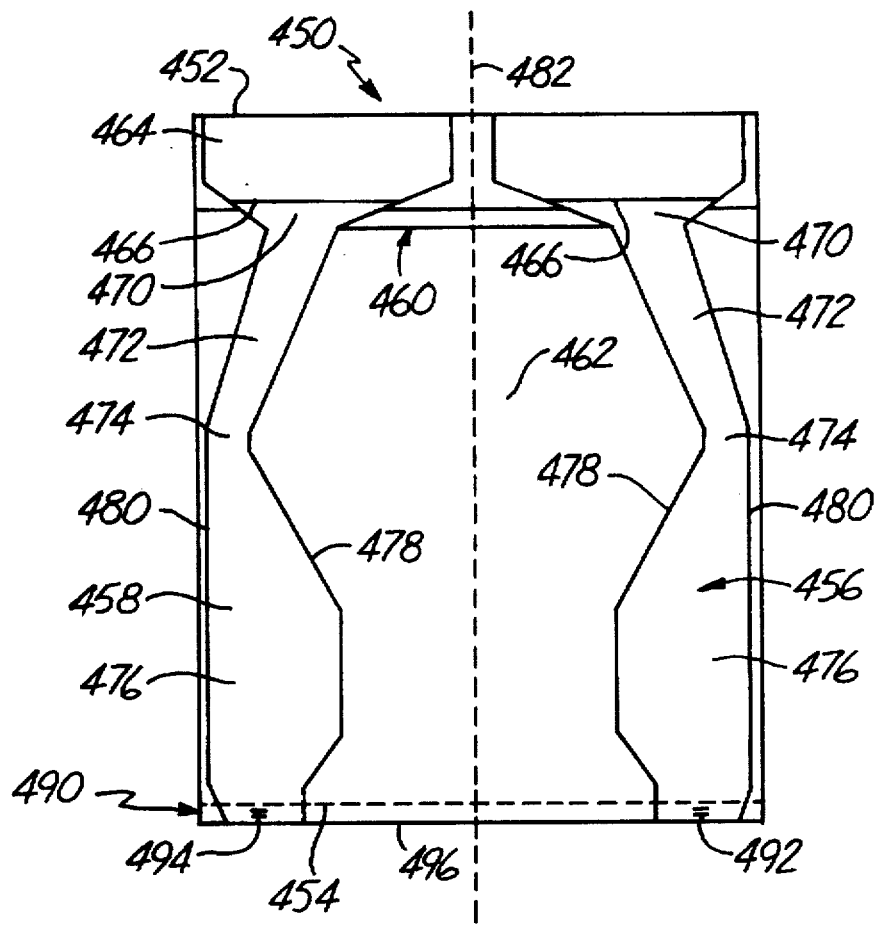
FIG. 17a is plan view of a slider according to another alternative embodiment of the present invention.

FIG. 17a is plan view of a slider according to another alternative embodiment of the present invention. Slider 450 includes leading edge trailing edge 454, inner rail 456, outer rail 458, cross rail 460, subambient pressure cavity 462 and leading taper 464. Leading taper 464 extends from leading edge 452 to an intersection 466 with the air bearing surfaces formed by rails 456 and 458.

Rails 456 and 458 include a leading portion 470, a leg portion 472, a waist portion 474 and a trailing portion 476. Rails 456 and 458 further include inside edges 478 and outside edges 480. Outside edges 480 converge toward one another along leg portion 472 and then diverge from one another along leading portion 470 as outside edges 480 cross intersection 466. In an alternative embodiment, outside edges 480 of rails 456 and 458 extend parallel to center line 482 from leg portion 472 to leading edge 452. Similarly, inside edges 478 converge toward one another along leg portion 472 at a first angle with respect to slider center line 482 and then converge toward one another at second angle, which is greater than the first angle, along leading portions 470 as inside edges 478 cross intersection 466. In the embodiment shown in FIG. 17a, inside edges 478 and outside edges 480 cross intersection 466 at an acute angle. This reduces the sensitivity of the outer rail flying height to variations in crown lapping as they affect the taper length and thus the location of intersection 466.

Slider 450 is fabricated by first lapping a flat surface over most of the length of the slider and then lapping leading taper 464 along leading edge 452. The air bearing surface features are then formed through photolithographic masking and etching techniques. Finally, a crown is lapped onto the air bearing surface by pressing the slider against a spherically shaped lapping plate. The spherical shape of the lapping plate is then transferred onto the finished air bearing surface. A crowned air bearing surface reduces collection of water condensate between the slider and the disc surface. Water condensate tends to pull the slider and the disc surface together by the action of meniscus surface tension. The force by which the slider and the disc surface are pulled together is known as "stiction". The stiction force may be high enough to prevent the spindle motor from starting up if the air bearing surface is not crowned.

Variations in the stock removal during the crown lapping process results in a variation of the location of the intersection 466 between leading taper 464 and the air bearing surfaces. It has been discovered that because inside edges 478 and outside edges 480 cross intersection 466 at an acute angle, preferably 20–70 degrees, that the outer rail flying height is less sensitive to variations in the location of intersection 466.

A further consequence of the spherical lapping process is that the slider is crowned in both the longitudinal and transverse directions. These crowns are commonly known as "length crown" and "cross-curve" Both the length crown and cross-curve affect the outer rail flying height by their influence on the flow field in the lubricating air. An air bearing surface is configured to achieve a specified outer rail flying height assuming nominal values of the length crown and cross curve.

An additional parameter effecting disc drive reliability is the close point flying height (CPFH). The close point flying height occurs at a point on the air bearing surface which is distant from the outer rail flying height. The pitch and roll angles of slider 450 are typically such that the close point flying height is at the inside edge 478 of outer rail 458, where this edge meets an interface between the ceramic wafer substrate of slider 450 and an encapsulation layer 490 which is attached to the substrate at trailing edge 454. Encapsulation layer 490 supports heads 492 and 494 at the trailing ends of rails 456 and 458. Encapsulation layer 490 has a trailing encapsulation edge 496.

The close point flying height would be at trailing encapsulation edge 496, but for the fact that the trailing encapsulation layer 490 is nominally recessed from the ceramic substrate of slider 450 by an etching action of the water used in the slider lapping and cleaning processes. Since the air bearing surface must be designed to obtain specified outer rail flying height, pitch and roll values, there is a protrusion of the close point flying height below the outer rail flying height. Similarly, the close point flying height protrudes below the recording head flying height, which is typically at about the same level as the outer rail flying height when the effect of nominal pole tip recession is included.

Figure 17B:
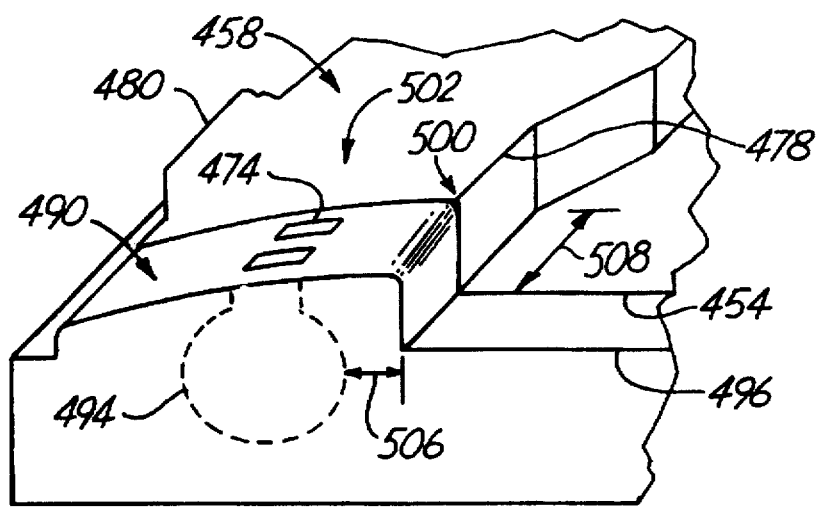

FIG. 17b is an enlarged, fragmentary perspective view of the trailing end of outer rail 458. The close point flying height is shown at 500. A component of close point flying height protrusion below the outer rail flying height is due to the cross curve. The outer rail flying height is measured near the recording head 494, at about the middle of outer rail 458 in the width direction, as shown at 502. The close point flying height 500 occurs at the inside edge 478 of outer rail 458 since the cross curve contour lapped onto the air bearing surface protrudes further from the slider body as outer rail 458 is transversed from outside edge 480 to inside edge 478. Therefore, it is desirable to place inside edge 478 of outer rail 458 as close as possible to recording head 494, while maintaining the integrity of the head and coil structure.

The close point flying height 500 occurs at the interface between the slider substrate material and the head encapsulation layer 490. The etching mask alignment is subject to process variations in the longitudinal direction along the slider. Given these process variations, recording head 494 requires a minimum distance 506 between the head structure and inside rail edge 478 to maintain the integrity of the head structure. In accordance with the present invention, inside edge 478 is positioned as close as possible to minimum distance 506 at trailing encapsulation edge 496 and trailing slider edge 454. Inside edge 478 extends parallel to slider center line 482 (shown in FIG. 17a) from trailing encapsulation edge 496 a sufficient distance 508 past trailing edge 454 of the slider substrate material to allow for longitudinal process variations in the mask alignment. In one embodiment, distance 508 is about 1.5 mils. For a symmetric air bearing design, this constraint on inside edge 478 of outer rail 458 applies by symmetry to inside edge 478 of inner rail 456.

Although the present invention has been described with reference to preferred embodiments, workers skilled in the art will recognize that changes may be made in form and detail without departing from the spirit and scope of the invention.

What is claimed is:

1. A self-loading disc head slider comprising:
   leading, trailing, inside and outside slider edges;
   first and second raised side rails comprising first and second bearing surfaces, respectively;
   a cross rail extending between the first and second raised side rails and comprising an upper surface which is coplanar with the first and second bearing surfaces;
   a tapered surface formed within the first and second raised side rails and the cross rail, wherein the tapered surface extends from the leading slider edge to an intersection with the first and second bearing surfaces and the upper surface of the cross rail and wherein the intersection defines a taper break;
   a subambient pressure cavity positioned between the cross rail and the trailing slider edge and having a cavity depth with respect to the bearing surfaces; and
   a notch positioned between the first and second raised side rails, extending from the leading slider edge toward the cross rail and terminating prior to the taper break, the notch having a notch depth with respect to the tapered surface which is equal to the cavity depth with respect to the bearing surfaces.

2. The self-loading slider of claim 1 wherein the notch defines a leading edge of the cross rail and the notch terminates a distance of 0.5 to 5.5 mils from the taper break.

3. The self-loading slider of claim 2 wherein the notch terminates a distance of 0.5 to 4.5 mils from the taper break.

4. The self-loading slider of claim 1 wherein:
   the first and second raised side rails have inside and outside rail edges; and
   the slider further comprises a width between the outside rail edges which is narrower along the tapered surface than along the first and second bearing surfaces.

5. The self-loading slider of claim 1 wherein:
   the first and second raised side rails each have inside and outside rail edges, a waist portion and a minimum width at the waist portion and wherein the outside rail edges converge toward one another as the first and second raised side rails extend from the waist portion toward the tapered surface.

6. The self-loading slider of claim 5 wherein:
   the slider further comprises a center line extending from the leading slider edge to the trailing slider edge; and
   the outside rail edges extend parallel to the center line from the taper break to the leading slider edge.

7. The self-loading slider of claim 5 wherein:
   the outside rail edges diverge from one another as the first and second raised side rails extend across the taper break.

8. The self-loading slider of claim 5 wherein the inside rail edges converge toward one another as the first and second raised side rails extend from the waist portion toward the tapered surface.

9. The self-loading slider of claim 1 and further comprising:
   a head encapsulation layer attached to the trailing slider edge and having a trailing encapsulation edge;
   wherein the first raised side rail extends to the trailing encapsulation edge and further comprises inside and outside rail edges;
   wherein the first and second bearing surfaces have a cross-curvature from the inside slider edge to the outside slider edge, such that the inside rail edge is raised from the outside rail edge at the trailing slider edge;

a first head formed in the first raised side rail within the head encapsulation layer and requiring a minimum distance from the first head to the inside rail edge to contain the first head within the first raised side rail; and wherein the inside rail edge is positioned at the minimum distance at the trailing encapsulation edge, extends parallel to the inside and outside slider edges from the trailing encapsulation edge to a location which is a selected distance past the trailing slider edge to allow for mask alignment variations, and then converges toward the second raised side rail.

10. The self-loading slider of claim 9 and further comprising a slider center line and a second head formed in the second raised side rail within the head encapsulation layer and wherein the second raised side rail is symmetrical to the first raised side rail about the slider center line.

11. The self-loading slider of claim 1 and further comprising:
a slider center line extending from the leading slider edge to the trailing slider edge;
a raised center rail positioned at the trailing slider edge along the slider center line, wherein the raised center rail widens toward the trailing slider edge and has a maximum width, with the maximum width defining first and second reference lines which are parallel to the slider center line;
a head supported by the raised center rail; and
wherein the first and second raised side rails each comprise a leading portion, a trailing portion and a waist portion therebetween and wherein the trailing portion widens from the waist portion toward the slider center line to a location between a respective one of the first and second reference lines and the slider center line.

12. The self-leading slider of claim 11 and further comprising:
first and second channels extending from the subambient pressure cavity to the trailing slider edge, between the raised center rail and the first and second raised side rails, respectively, and having a channel depth which is equal to the cavity depth.

13. The self-leading slider of claim 12 wherein the first and second raised side rails and the raised center rail have sloped side walls which define a transition region from the first and second bearing surfaces to the cavity depth, wherein the transition region has a transition width and wherein the first and second channels have a channel width which is at least as great as twice the transition width.

14. The self-loading slider of claim 12 wherein the first and second channels have a channel width from 0.8 to 8.0 mils.

15. The self-loading slider of claim 11 wherein the raised center rail comprises a raised center island.

16. The self-loading slider of claim 1 wherein the cross rail further comprises a leading cross rail edge which is positioned along the tapered surface and is recessed from the first and second bearing surfaces.

17. A self-loading disc head slider comprising:
leading, trailing, inside and outside slider edges;
first and second raised side rails comprising first and second bearing surfaces, respectively;
a cross rail extending between the first and second raised side rails;
a subambient pressure cavity positioned between the first and second raised side rails and extending from the cross rail toward the trailing slider edge, wherein the cross rail is raised from the subambient pressure cavity;

a tapered surface formed within the first and second raised side rails and extending from the leading slider edge to an intersection with the first and second bearing surfaces; and wherein the first and second raised side rails each have inside and outside rail edges, a leading portion, a waist portion, and a leg extending from the waist portion to the leading portion, wherein the outside rail edges converge toward one another along the leg from the waist portion to the leading portion and then diverge from one another along the leading portion and the tapered surfaces as the outside rail edges cross the intersection.

18. The self-loading slider of claim 17 and further comprising:
a slider center line extending from the leading slider edge to the trailing slider edge; and
wherein the inside edges converge toward one another along the leg at a first angle with respect to the slider center line and then converge toward one another at a second angle, which is greater than the first angle, along the leading portion as the inside rail edges cross the intersection.

19. The self-loading slider of claim 17 and further comprising:
a head encapsulation layer attached to the trailing slider edge and having a trailing encapsulation edge;
wherein the first raised side rail extends to the trailing encapsulation edge;
wherein the first and second raised side rails have a surface cross-curvature from the inside slider edge to the outside slider edge, such that the inside rail edge of the first raised side rail is raised from the outside rail edge of the first raised side rail at the trailing slider edge;
a first head formed in the first raised side rail within the head encapsulation layer and requiring a minimum distance from the first head to the inside rail edge of the first raised side rail to contain the first head within the first raised side rail; and
wherein the inside rail edge of the first raised side rail is positioned at the minimum distance adjacent the trailing encapsulation edge, extends parallel to the inside and outside slider edges from the trailing encapsulation edge to a point which is a selected distance past the trailing slider edge to allow for longitudinal mask alignment variations, and then converges toward the second raised side rail.

20. The self-loading slider of claim 19 and further comprising a slider center line and a second head formed in the second raised side rail within the head encapsulation layer and wherein the second raised side rail is symmetrical to the first raised side rail about the slider center line.

21. The self-loading slider of claim 17 and further comprising:
a slider center line extending from the leading slider edge to the trailing slider edge;
a raised center rail positioned at the trailing slider edge along the slider center line, wherein the raised center rail widens toward the trailing slider edge and has a maximum width, with the maximum width defining first and second reference lines which are parallel to the slider center line;
a head supported by the raised center rail; and
wherein the first and second raised side rails each further comprise a trailing portion positioned between the waist portion and the trailing slider edge, wherein the trailing portion widens from the waist portion toward the slider center line to a location between a respective one of the first and second reference lines and the slider center line.

22. The self-loading slider of claim 21 and further comprising:

first and second channels extending from the subambient pressure cavity to the trailing slider edge, between the raised center rail and the first and second raised side rails, respectively, and having a channel depth which is equal to the cavity depth.

23. The self-loading slider of claim 22 wherein the first and second raised side rails and the raised center rail have sloped side walls which define a transition region from the first and second raised side rails to the subambient pressure, wherein the transition region has a transition width and wherein the first and second channels have a channel width which is at least as great as twice the transition width.

24. The self-loading slider of claim 22 wherein the first and second channels have a channel width from 0.8 to 8.0 mils.

25. The self-loading slider of claim 21 wherein the raised center rail comprises a raised center island.

26. A self-loading disc head slider comprising:

a slider body having a leading slider edge and a trailing slider edge;

first and second raised side rails positioned on the slider body and comprising first and second bearing surfaces, respectively;

a cross rail extending between and partially coplanar with the first and second raised side rails, the cross rail having a leading edge;

a tapered surface formed within the first and second raised side rails and the cross rail, wherein the tapered surface extends from the leading slider edge to an intersection with the first and second bearing surfaces;

a subambient pressure cavity positioned between the cross rail and the trailing slider edge; and a notch positioned within the tapered surface, extending from the leading slider edge toward the trailing slider edge and terminating prior to the intersection, the notch defining the leading edge of the cross rail along the tapered surface such that the leading edge of the cross rail is recessed toward the slider body from the first and second bearing surfaces.

27. The self-loading disc head slider of claim 26 wherein the notch forms a notch surface which is generally parallel to and recessed from the tapered surface, toward the slider body.

* * * * *